US007840181B2

(12) United States Patent
Umeda et al.

(10) Patent No.: US 7,840,181 B2
(45) Date of Patent: *Nov. 23, 2010

(54) RECTIFIER CIRCUIT AND RADIO COMMUNICATION DEVICE

(75) Inventors: Toshiyuki Umeda, Tokyo (JP); Shoji Ootaka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 73 days.

This patent is subject to a terminal disclaimer.

(21) Appl. No.: 12/041,468

(22) Filed: Mar. 3, 2008

(65) Prior Publication Data

US 2008/0158926 A1  Jul. 3, 2008

Related U.S. Application Data

(63) Continuation of application No. 11/153,532, filed on Jun. 16, 2005, now Pat. No. 7,424,265.

(30) Foreign Application Priority Data

Jun. 17, 2004 (JP) ............... 2004-180164
May 25, 2005 (JP) ............... 2005-152990

(51) Int. Cl.
*H04B 5/00* (2006.01)

(52) U.S. Cl. .................. 455/41.1; 455/169.1; 455/299; 455/333; 340/10.4; 340/538.16; 340/854.8; 327/331; 327/332; 327/389; 318/400.22; 318/400.26

(58) Field of Classification Search ............... 455/41.1, 455/169.1, 299, 333; 340/10.4, 538.16, 572.5, 340/660, 693.4, 854.8; 327/331, 332, 343, 327/389, 391, 534, 535; 318/400.22, 400.26

See application file for complete search history.

(56) References Cited

U.S. PATENT DOCUMENTS 4,031,481 A * 6/1977 Yoshida ................... 330/269

(Continued)

FOREIGN PATENT DOCUMENTS

EP          0 840 452 A1     5/1998

(Continued)

OTHER PUBLICATIONS

"Powder LSI: An Ultra Small RF Identification Chip for Individual Recognition Applications" ISSCC 2003/Session 22/TD: Embedded Technologies/Paper 22.7 Feb. 12, 2003, pp. 398-399 Mitsuo Usami, et al.

(Continued)

*Primary Examiner*—Tuan H Nguyen
(74) *Attorney, Agent, or Firm*—Oblon, Spivak, McClelland, Maier & Neustadt, L.L.P.

(57) ABSTRACT

A first bias circuit outputs a first direct-current voltage to charge a first capacitor based on a clock signal. A second bias that outputs a second direct-current voltage to charge a second capacitor based on a clock signal. A first MOS transistor has a gate and a source. The first direct-current voltage is applied between the gate and the source of the first MOS transistor to bias the gate of the first MOS transistor. A second MOS transistor has a gate and a source, and a drain connected to the source of the first MOS transistor. The second direct-current voltage is applied between the gate and the source of the second MOS transistor to bias the gate of the second MOS transistor. A coupling capacitor has a first end connected to the source of the first MOS transistor, and a second end to which an alternating-current signal is input.

21 Claims, 19 Drawing Sheets

U.S. PATENT DOCUMENTS

| | | | |
|---|---|---|---|
| 4,455,628 A * | 6/1984 | Ozaki et al. | 365/226 |
| 5,173,849 A * | 12/1992 | Brooks | 363/127 |
| 5,394,359 A | 2/1995 | Kowalski | |
| 2002/0118557 A1 | 8/2002 | Ohlsson | |
| 2003/0021158 A1 | 1/2003 | Gomez | |
| 2005/0052287 A1 * | 3/2005 | Whitesmith et al. | 340/825.72 |

FOREIGN PATENT DOCUMENTS

| | | | |
|---|---|---|---|
| JP | 2-29022 | | 1/1990 |
| JP | 5-211772 | | 8/1993 |
| JP | 05-211772 | * | 8/1993 |
| JP | 2001-166837 | | 6/2001 |
| JP | 2002-15574 | | 1/2002 |
| JP | 2002-152080 | | 5/2002 |
| JP | 2002-261273 | | 9/2002 |
| JP | 2003-6777 | | 1/2003 |
| WO | WO 2004/040658 A1 | | 5/2004 |

OTHER PUBLICATIONS

Hamid Reza Mehrvarz, et al. "A pseudologarithmic Rectifier Using Unbalanced Bias MFMOS Differential Pairs" IEEE Journal of Solid-State Circuits, vol. 33, No. 1, XP-000766616, Jan. 1998, pp. 28-34.

* cited by examiner

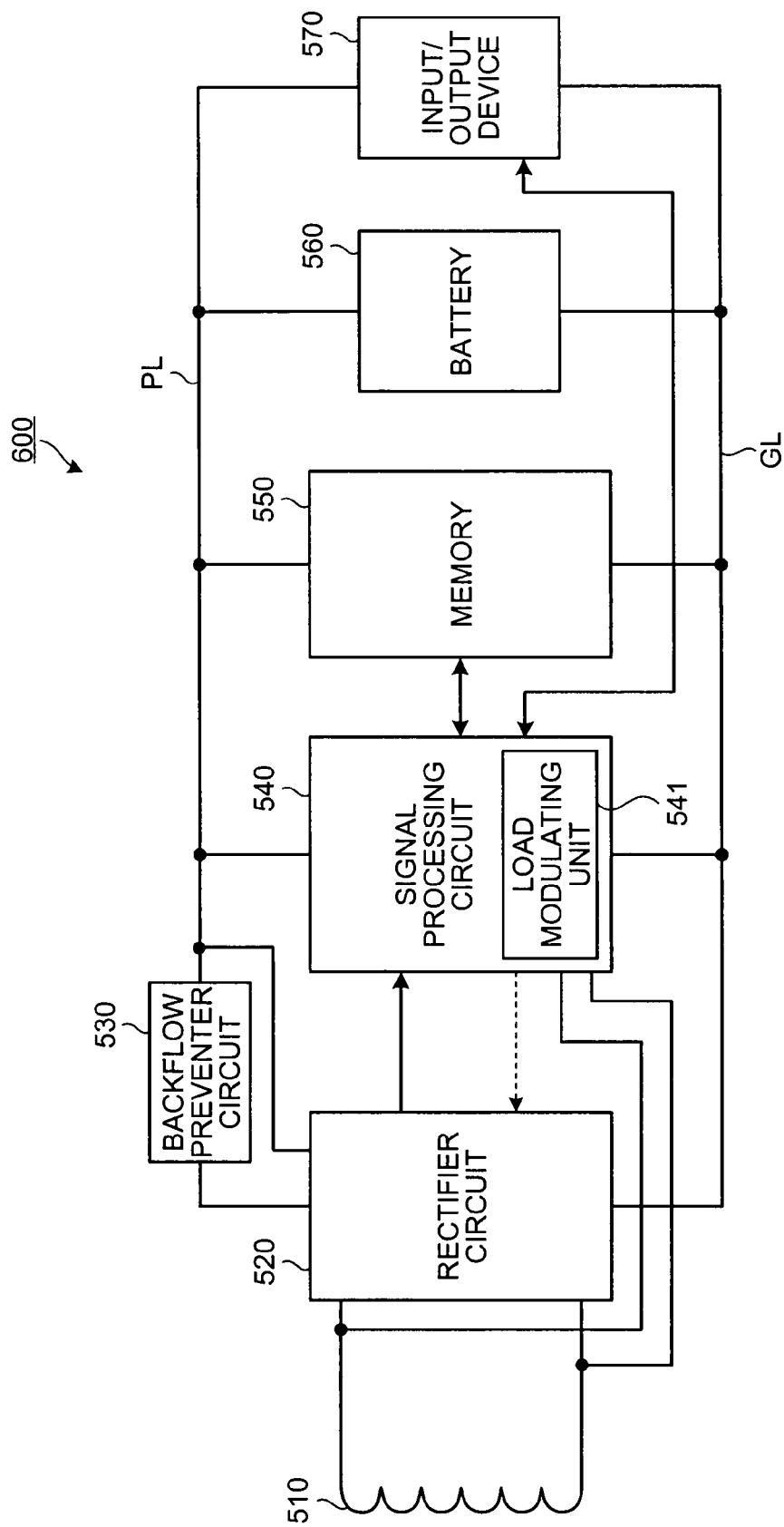

RECTIFIER CIRCUIT AND RADIO COMMUNICATION DEVICE

CROSS-REFERENCE TO RELATED APPLICATIONS

The present application is a continuation of application Ser. No. 11/153,532, filed on Jun. 16, 2005, which claims the benefit of priority from the prior Japanese Patent Application No. 2004-180164, filed on Jun. 17, 2004, and Japanese Patent Application No. 2005-152990, filed on May 25, 2005. The entire contents of the above applications are incorporated herein by reference.

BACKGROUND OF THE INVENTION

1. Field of the Invention

The present invention relates to a rectifier circuit and a radio communication device including the rectifier circuit.

2. Description of the Related Art

A rectifier circuits converts alternating-current (AC) into direct-current (DC) through the rectification of diodes. The rectifier circuit, when is provided as a semiconductor integrated circuit, employs a diode-connected MOS transistor whose source and gate are connected to each other, as a diode. For example, when an NMOS transistor isolated from a substrate through a triple well is used as a diode, its drain and source are connected to an n-well and the source is also connected to a backgate connected to a p-well located at the bottom of the transistor. This diode functions in a PN junction formed between the source and drain.

A radio frequency identification (RFID) tag, which is categorized as a communication device and is recently watched because of its wide application, requires the rectifier circuit. The RFID tag generates the direct-current power-supply voltage for driving the integrated circuit in the RFID tag and demodulates data signals, from an alternating-current induced in a loop antenna. The voltage generation and demodulation require the rectifier circuit.

Such a rectifier circuit used in the RFID tag is proposed in, for example, Japanese Patent Application Laid-Open No. 2002-152080 and M. Usami et al., "Powder LSI: An ultra small RF identification chip for individual recognition applications", ISSCC Dig. Tech. Papers, February 2003, pp. 398-399.

However, to perform rectification of the diode, a voltage not less than the threshold (approximately 0.7 V) of the MOS transistor must be applied across the PN junction, i.e., across the source and drain. Therefore, conventional rectifier circuits cannot rectify the AC signal with an root-mean-square value less than the threshold. This means that the RFID tag cannot receive a weak signal transmitted by a reader/writer. Actually, such limitation of receivable signal power restricts the distance that the RFID tag can communicate with the reader/writer, to approximately 30 cm. This distance requires approach to the reader/writer of persons carrying the RFID tag or the RFID tag attached items, so that convenience is reduced. This distance also makes one reader/writer difficult to detect plural RFID tags simultaneously, and restricts the application range of the RFID tag.

SUMMARY OF THE INVENTION

According to one aspect of the present invention, a rectifier circuit includes a bias circuit that outputs a direct-current voltage; a first MOS transistor that has a gate and a source; and a second MOS transistor that has a gate, a source, and a drain connected to the source of the first MOS transistor. Only the direct-current voltage is applied between the gate and the source of the first MOS transistor, and only the direct-current voltage being applied between the gate and the source of the second MOS transistor. The rectifier circuit also includes a coupling capacitor that has a first end which is connected to the source of the first MOS transistor, and a second end to which an alternating-current signal is input.

According to another aspect of the present invention, a rectifier circuit includes a first floating-gate transistor that has a control gate and a source which are connected to each other, a drain, and a first floating gate which holds a predetermined potential; a second floating-gate transistor that has a control gate and a source which are connected to each other, a drain which is connected to the source of the first floating-gate transistor, and a second floating gate which holds a predetermined potential; and a coupling capacitor that has a first end which is connected to the source of the first floating-gate transistor, and a second end to which an alternating-current signal is input.

According to still another aspect of the present invention, a radio communication device includes a loop antenna; the rectifier circuit according to the present invention; a memory that stores tag identification information; and a signal processing circuit that transmits and receives the tag identification information through the loop antenna based on a direct current rectified by the rectifier circuit.

BRIEF DESCRIPTION OF THE DRAWINGS

FIG. 21 is a block diagram of another RFID tag according to the sixth embodiment.

DETAILED DESCRIPTION OF THE PREFERRED EMBODIMENTS

Exemplary embodiments of a rectifier circuit and a radio communication device including the RFID tag according to the present invention will be described in detail below with reference to the accompanying drawings. In particular, an RFID tag will be exemplified as an example of the radio communication device.

A rectifier circuit according to a first embodiment of the present invention includes a diode-connected MOS transistor where a constant voltage is applied between its source and gate. In particular, the constant voltage is less than a threshold required for rectification in the MOS transistor, preferably a voltage value near the threshold.

Figure 1:
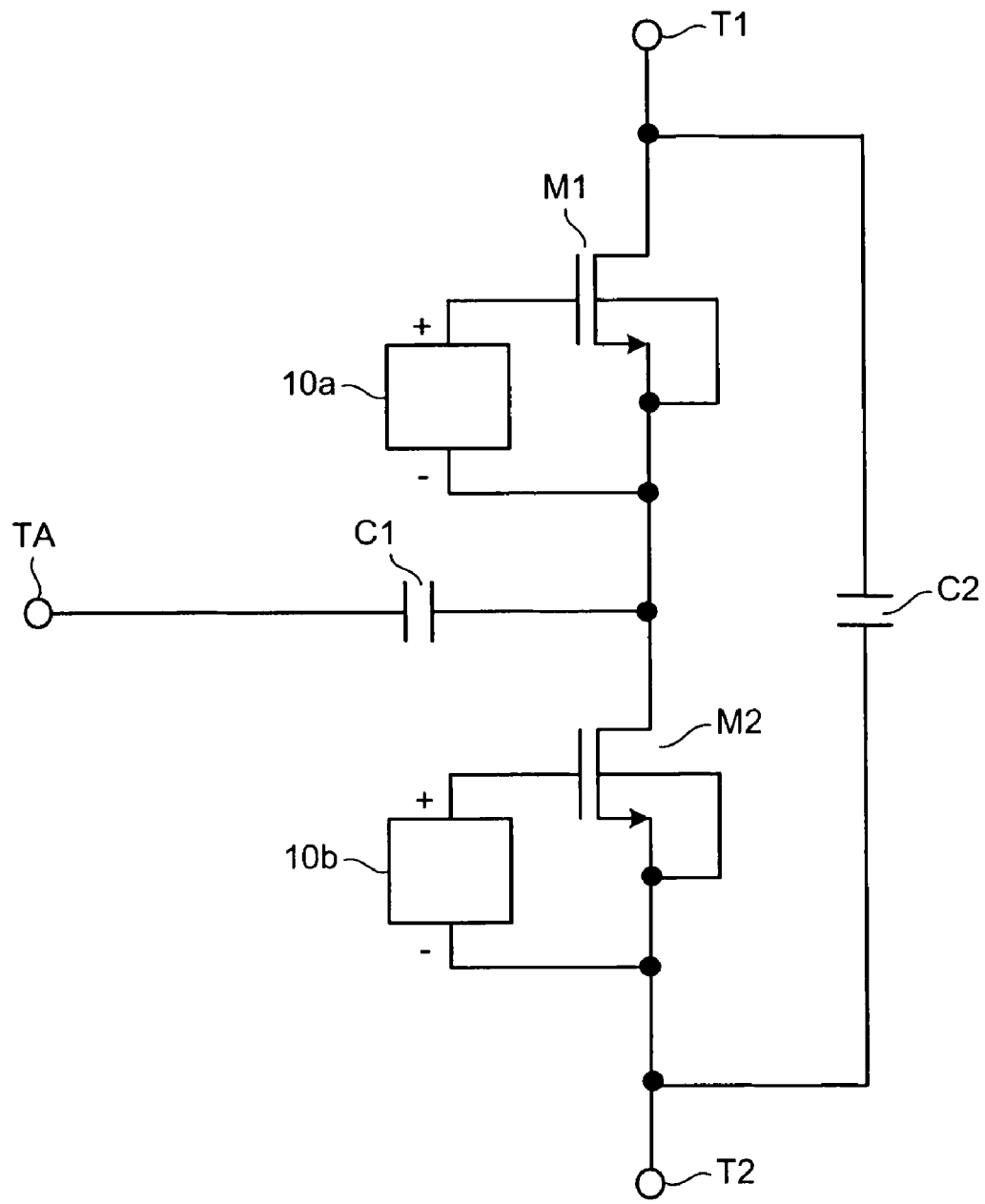
FIG. 1 is a circuit diagram of a part of a rectifier circuit according to a first embodiment.

FIG. 1 is a circuit diagram of a part of a rectifier circuit (hereinafter referred to as "diode circuit") according to a first embodiment. The diode circuit shown in FIG. 1 includes an NMOS transistor M1 whose backgate and source which are connected to each other, and whose drain is connected to a positive terminal T1. The diode circuit also includes a bias circuit 10a connected between the source and a gate of the NMOS transistor M1. The bias circuit 10a generates a predetermined voltage. Such a connection makes the NMOS transistor M1 function as a diode with a PN junction on the drain side. The bias circuit 10a applies the predetermined voltage between the gate and the source of the NMOS transistor M1. Specifically, the bias circuit 10a generates as the predetermined voltage a voltage (hereinafter referred to as "diode bias voltage") less than a threshold required for the rectification in the NMOS transistor M1. The diode bias voltage ranges, for example, from 0 to 1.0 voltages, is preferably a value near the threshold, e.g., 0.6V. In other words, the NMOS transistor M1 is biased with the diode bias voltage between the gate and source to rectify an AC signal with a root-mean-square value not more than the threshold voltage. The diode circuit can rectify, when the diode bias voltage is 0.6 V for example, an AC signal with a root-mean-square value of approximately 100 mV.

The diode circuit further includes an NMOS transistor M2 whose backgate and source are connected to each other. The source of the NMOS transistor M2 is connected to a negative terminal T2. A bias circuit 10b is connected between the gate and the source of the NMOS transistor M2. The NMOS transistor M2 also has the same function as that of the NMOS transistor M1, and is biased with the diode bias voltage between its gate and source through the bias circuit 10b.

The source of the NMOS transistor M1 and the drain of the NMOS transistor M2 are connected to each other, and a line connecting them is connected to one end of a capacitor C1. The other end of the capacitor C1 is connected to a signal input terminal TA. This capacitor C1 functions as a coupling capacitor. The capacitor C1, when the rectifier circuit according to this embodiment is used in the RFID tag, is connected to the loop antenna, and functions as a series resonance capacitor.

A capacitor C2 is connected between the drain of the NMOS transistor M1 and the source of the NMOS transistor M2. The signal half-wave rectified by the NMOS transistors M1 and M2 is smooth through the capacitor C2. This smoothing allows the output of a direct-current voltage from both ends of the capacitor C2, that is, between the positive terminal T1 and the negative terminal T2.

The NMOS transistors M1 and M2 are formed to have a triple well structure, and are isolated from a substrate. Therefore, each source is connected to a p-well located at the bottom of the NMOS transistor, and each drain is connected to an n-well. The diode is formed as a PN junction in each MOS transistor.

Figure 2:
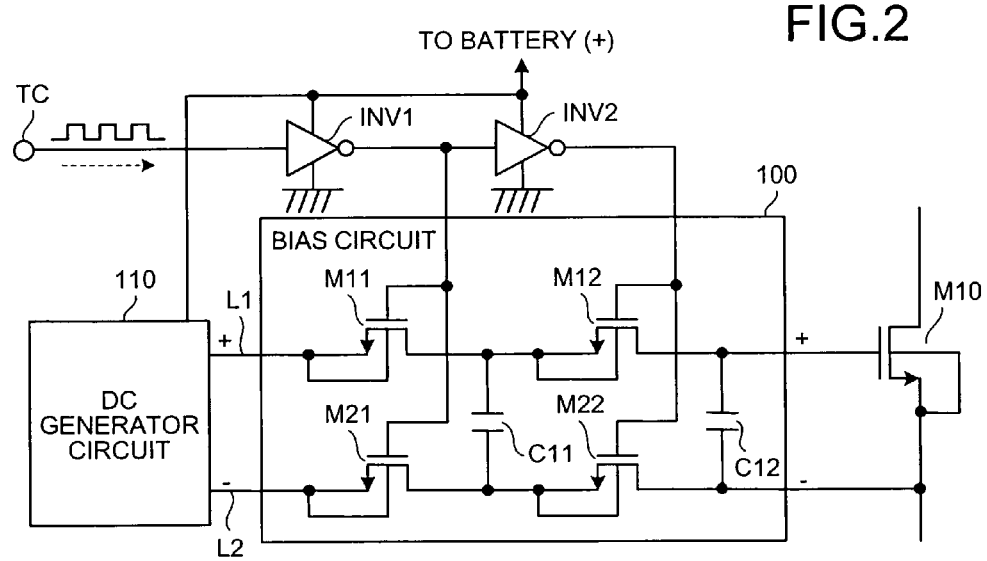
FIG. 2 is a circuit diagram of an example of a bias circuit.

FIG. 2 is a circuit diagram of an example of the bias circuit 10a or 10b. A bias circuit 100 shown in FIG. 2 corresponds to the bias circuit 10a or 10b. The bias circuit 100 includes two NMOS transistors M11 and M12 connected in series. Each of the NMOS transistors M11 and M12 functions as a transfer gate, and is arranged on a positive line L1. The bias circuit 100 further includes two NMOS transistors M21 and M22 which are connected in series on a negative line L2 and which function as transfer gates, respectively. The gates of the NMOS transistors M11 and M21 are connected to each other, and the gates of the NMOS transistors M12 and M22 are connected to each other. A capacitor C11 is connected between a line connecting the drain of the NMOS transistor M11 to the source of the NMOS transistor M12 and a line connecting the drain of the NMOS transistor M21 to the source of the NMOS transistor M22. A capacitor C12 is connected between the drain of the NMOS transistor M12 and the drain of the NMOS transistor M22.

The bias circuit 100 is connected with an inverter INV1, an inverter INV2, and a DC generator circuit 110, which are peripheral circuits. The DC generator circuit 110 generates a DC voltage corresponding to the diode bias voltage from a main power voltage supplied to the rectifier circuit according to this embodiment. This DC generator circuit 110 will be described in detail later. The DC voltage generated by the DC generator circuit 110 is applied between the positive line L1 and the negative line L2 of the bias circuit 100. Since the NMOS transistor M10, which represents the NMOS transistors M1 and M2 shown in FIG. 1, operates at high frequencies, e.g., several GHz order, the parasitic capacitance in the NMOS transistor M10 should be reduced as much as possible. The DC generator circuit 110 has a high capacitance to generate a stable DC voltage. Therefore, the bias circuit 100 as shown in FIG. 2 is provided, so that the diode bias voltage output from the DC generator circuit 110 is not directly applied between the gate and source of the NMOS transistor M10.

The input terminal of the inverter INV1 is connected to a clock input terminal TC, and receives clock pulses with a predetermined frequency. The clock pulses, for example, are generated by a clock generator circuit, which is described later. The output terminal of the inverter INV1 is connected to each gate of the NMOS transistors M11 and M21, and the input terminal of the inverter INV2. The output terminal of the inverter INV2 is connected to each gate of the NMOS transistors M12 and M22.

When the clock pulse input from the clock input terminal TC is a logic "low", the inverter INV1 outputs a logic "high" and the inverter INV2 outputs a logic "low". Therefore, the NMOS transistors M11 and M21 are turned on, and the capacitor C11 is charged with the DC voltage supplied from the DC generator circuit 110. Moreover, the NMOS transistors M12 and M22 are turned off, and no DC voltage is applied to the capacitor C12.

When the clock pulse input from the clock input terminal TC is a logic "high", the inverter INV1 outputs a logic "low" and the inverter INV2 outputs a logic "high". Therefore, the NMOS transistors M11 and M21 are turned off, and the NMOS transistors M12 and M22 are turned on, so that the electric charge charged in the capacitor C11 is supplied to the capacitor C12. Since both ends of the capacitor C12 are connected to the output terminals of the bias circuit 100, the voltage at these ends of the capacitor C12 is applied between the gate and source of the NMOS transistor M10 diode-connected, as a diode bias voltage.

Eventually, it is only necessary that the voltage at both ends of the capacitor C12 be the diode bias voltage of the NMOS transistor M10. The DC voltage supplied from the DC generator circuit 110 may be the same as the diode bias voltage. For example, the voltage of the capacitor C12 can be fixed to any value by switching the NMOS transistors M11, M12, M21, and M22 using pulse wide modulation (PWM) control. In this case, a main power source may be connected between the positive line L1 and the negative line L2 without the DC generator circuit 110.

Figure 3:
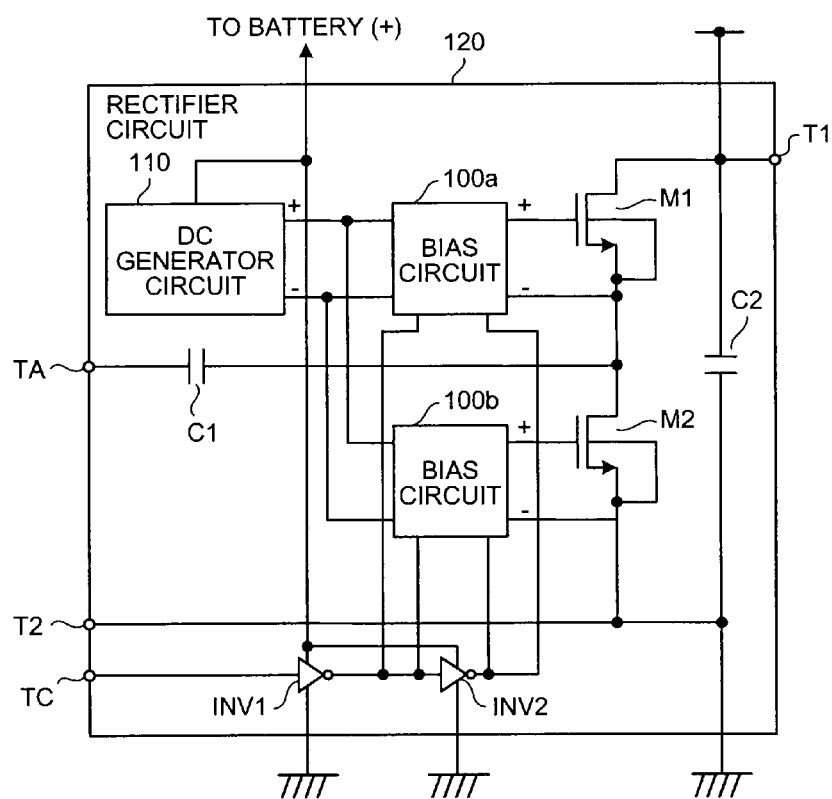
FIG. 3 is a block diagram of the rectifier circuit according to the first embodiment.

FIG. 3 is a block diagram of the rectifier circuit according to the first embodiment. The rectifier circuit 120 shown in FIG. 3 is a circuit that the bias circuit 100 and the peripheral circuit (the DC generator circuit 110, and the inverters INV1 and INV2) shown in FIG. 2 are applied to the diode circuit shown in FIG. 1. Each of bias circuits 100a and 100b shown in FIG. 3 corresponds to the bias circuit 100 shown in FIG. 2. As shown in FIG. 3, the NMOS transistors M1 and M2 each of which is diode-connected needs the bias circuit 100 shown in FIG. 2. The DC generator circuit 110 and the inverters INV1 and INV2, which are the peripheral circuits, are shared by the bias circuits 100a and 100b.

Though the diode circuit as described above are formed by the two diode-connected NMOS transistors, two diode-connected PMOS transistors may be used instead. In addition, the transfer gates constituting the bias circuit 100, which are NMOS transistors as described above, may be NMOS transistors. The NMOS transistors M12 and M22 shown in FIG. 2 may be replaced with PMOS transistors without the inverter INV2.

Figure 4:
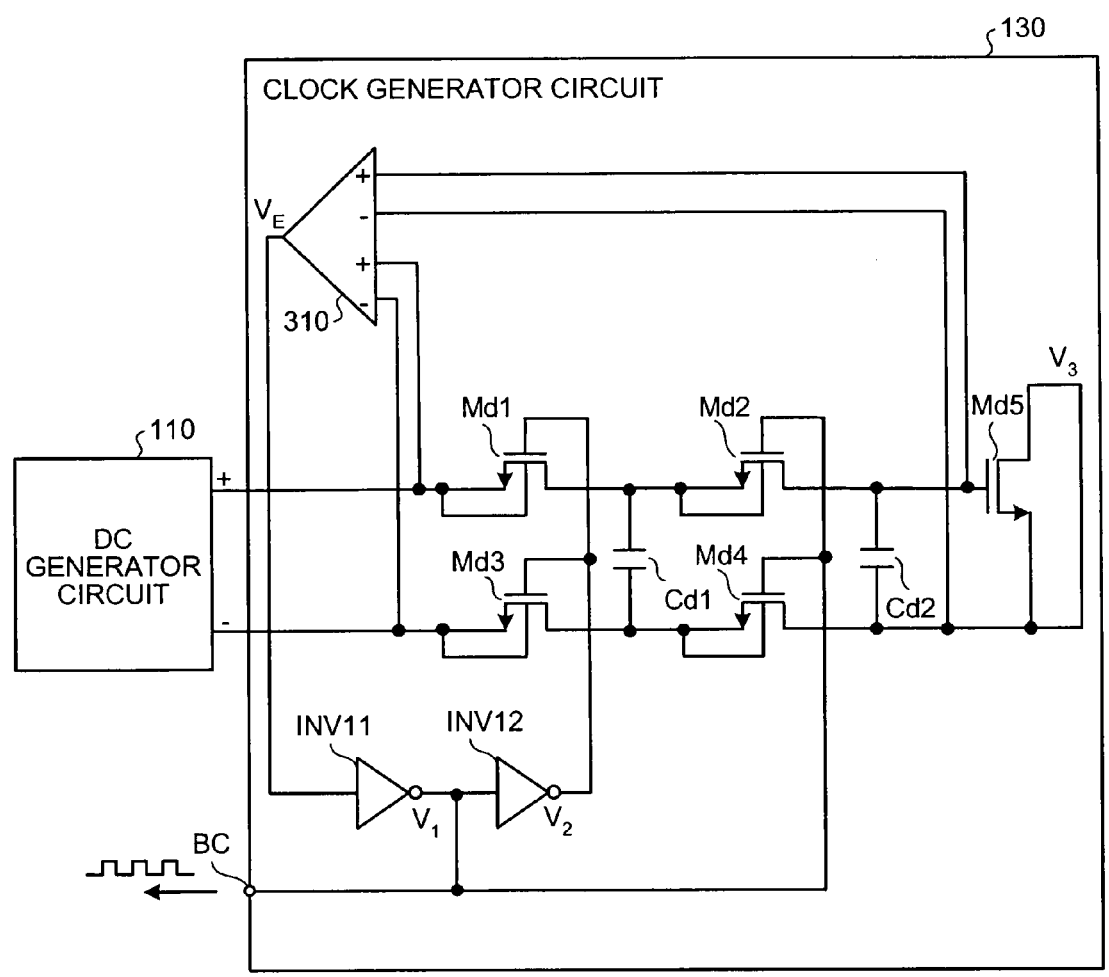
FIG. 4 is a circuit diagram of a clock generator circuit used in the rectifier circuit according to the first embodiment.

FIG. 4 is a circuit diagram of the clock generator circuit 130 which generates the clock pulses input to the clock input terminal TC of the rectifier circuit 120. The clock generator circuit 130 includes a dummy rectification block, a dummy switching block, and a differential amplifier 310. The dummy rectification block is a partially-duplicated circuit of the rectification block of the rectifier circuit 120, includes an NMOS transistor Md5 having the same shape as that of the NMOS transistor M1 or M2. The backgate and source of the NMOS transistor Md5 are connected to each other. The source and drain of the NMOS transistor Md5 are connected to a negative terminal, and has a potential V3. A capacitor Cd2 is connected between the gate and source of the NMOS transistor Md5. Specifically, the dummy rectification block imitates one of rectifying devices which constitutes the rectification block of the rectifier circuit 120.

The dummy switching block includes NMOS transistors Md1 to Md4, capacitors Cd1 and Cd2, and inverters INV11 and INV12. The connection of the NMOS transistors Md1 to Md4, and the capacitors Cd1 and Cd2 is the same as that of the switching block of the bias circuit 100a or 100b of the rectifier circuit 200.

Specifically, each of the NMOS transistors Md1 and Md2 functions as a transfer gate, and is arranged on a positive line. Each of the NMOS transistors M11 and M12 which are connected in series functions as a transfer gate, and is arranged on a negative line. The gate of the NMOS transistor Md1 and the gate of the NMOS transistor Md3 are both connected to the output terminal of the inverter INV12. The input terminal of the inverter INV12 is connected to the output terminal of the inverter INV11. The gate of the NMOS transistor Md2 and the gate of the NMOS transistor Md4 are both connected to the output terminal of the inverter INV11. A capacitor Cd1 is connected between a line connecting the drain of the NMOS transistor Md1 to the source of the NMOS transistor Md2 and a line connecting the drain of the NMOS transistor Md3 to the source of the NMOS transistor Md4. A capacitor Cd2 is connected between the drain of the NMOS transistor Md2 and the drain of the NMOS transistor Md4.

The source of the NMOS transistor Md1 and the source of the NMOS transistor Md3 are connected to a positive terminal and a negative terminal of the DC generator circuit 110 respectively, as that in the bias circuit 100 shown in FIG. 2. The differential amplifier location 310 amplifies a difference voltage between the voltage across both ends of the capacitor Cd2 and a reference voltage by an appropriate gain to output a base clock voltage $V_E$. The reference voltage is represented as a voltage $V_T-V_X$ where $V_T$ is a DC voltage supplied from the DC generator circuit 110 and $V_X$ is, for example, 50 mV. In other words, the differential amplifier 310 monitors the voltage of the capacitor Cd2 to generate the base clock voltage $V_E$.

The output terminal of the differential amplifier 310 is connected to the input terminal of the inverter INV11. The output terminal of the inverter INV11 is connected to the output terminal BC of the clock generator circuit 130. The output terminal BC is connected to the clock input terminal TC of the rectifier circuit 120. As a result, when the base clock voltage $V_E$ output from the differential amplifier 310 reaches not less than a predetermined level, and when the base clock voltage $V_E$ drops to less than a predetermined level, the inverter INV1 outputs a logic "high".

Figure 5:
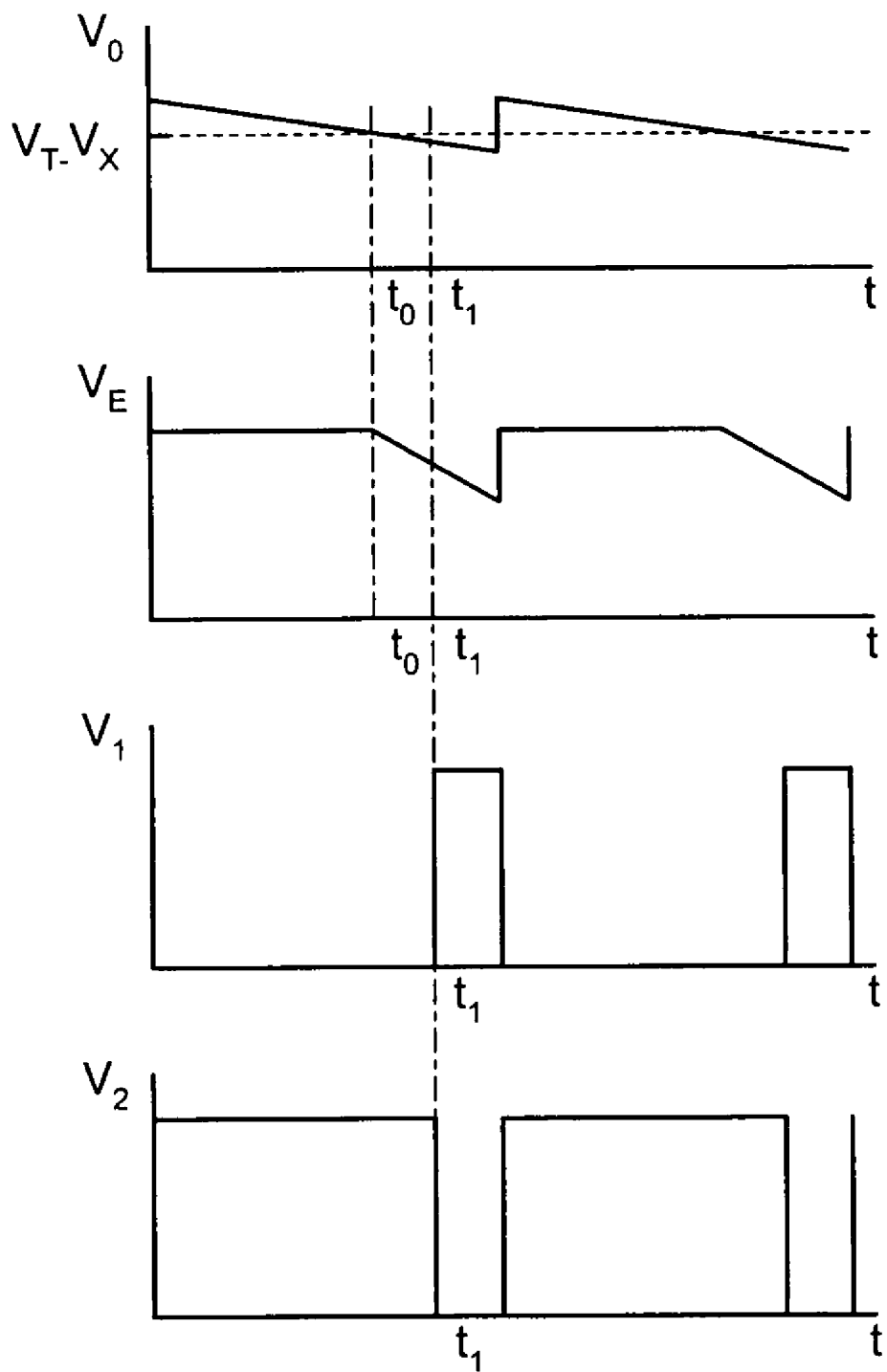
FIG. 5 is a timing chart of the clock generator circuit of the rectifier circuit according to the first embodiment.

FIG. 5 is a timing chart of a potential $V_0$ at one end of the capacitor Cd2, the difference voltage $V_E$ output from the differential amplifier 310, a output potential $V_1$ of the inverter INV11, and a output potential $V_2$ of the inverter INV12.

The differential amplifier 310 outputs the positive difference voltage $V_E$ saturated to a predetermined value during a time period that the potential $V_0$ is more than the reference voltage $V_T-V_X$, i.e., until time $t_0$ (the first phase). This positive difference voltage $V_E$ is a logic "high" for the inverter INV11. Accordingly, during the time period, the output potential $V_1$ of the inverter INV11 is a logic "low" and the output potential $V_2$ of the inverter INV12 is a logic "high". As a result, the NMOS transistors Md1 and Md3 are turned on, and the DC voltage $V_T$ of the DC generator circuit 110 is applied to the capacitor Cd1.

Since the capacitor Cd2 is discharged through leakage current of the NMOS transistor Md5, the potential $V_0$ decreases gradually and finally becomes smaller than the reference voltage $V_T-V_X$ (the second phase). Specifically, the difference voltage $V_E$ output from the differential amplifier 310 decreases gradually from the positive saturated level, and finally becomes an input signal of a logic "low" for the inverter INV11 (time $t_1$: the third phase). As a result, the output potential $V_1$ of the inverter INV11 becomes a logic "high", and the output potential $V_2$ of the inverter INV12 becomes a logic "low". Moreover, the NMOS transistors Md2 and Md4 are turned on, and the electric charge on the capacitor Cd1 is applied to the capacitor Cd2. Specifically, the potential $V_0$ of the capacitor Cd2 is almost equal to the potential $V_T$ more than the reference voltage $V_T-V_X$, and enters the first phase. After that, the first to third phases are repeated.

The output potential $V_1$ is a pulse generated periodically during the phase repetition. The rectifier circuit 120 accepts this output potential $V_1$ as a clock pulse. In particular, since the clock generator circuit 130 imitates a part of the rectifier circuit 120, the clock pulse is output at the best timing for efficiently charging the capacitors (corresponding to the capacitors C11 and C12 in FIG. 2) in the bias circuit 100a or 100b of the rectifier circuit 120. Therefore, the NMOS transistors M1 and M2, which constitutes the rectifying block, are always biased with a voltage more than a predetermined level, and the gain of the rectifier circuit 120 is always maintained more than a predetermined value.

PMOS transistors may be used as the MOS transistors used for the clock generator circuit 130.

The rectifier circuit 120 and the clock generator circuit 130 both use the constant DC voltage supplied from the DC generator circuit 110. There is a possibility that this DC voltage does not indicate a desired value because of the manufacturing difference of the electronic devices which constitute the DC generator circuit 110. However, the DC generator circuit 110 according to this embodiment can generate the DC voltage that does not depend on such a manufacturing difference.

Figure 6:
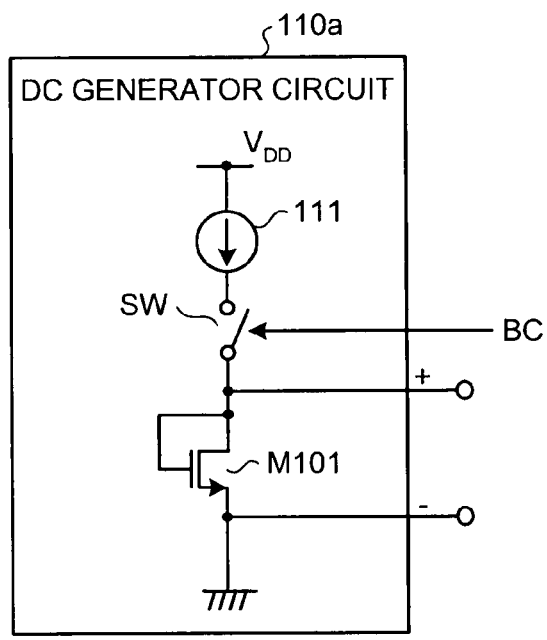
FIG. 6 is a circuit diagram of an example of a DC generator circuit.

FIG. 6 is a circuit diagram of an example of the DC generator circuit 110. The DC generator circuit 110a shown in FIG. 6 includes an NMOS transistor M101 whose gate and drain are connected to each other, and a constant-current source 111 that generates a constant-current from a power supply voltage $V_{DD}$. The output terminal of the constant-current source 111 and the drain of the NMOS transistor M101 are connected to each other through a switch SW. The source of the NMOS transistor M101 is grounded. The voltage between the gate and source of the NMOS transistor M101 corresponds to the DC voltage $V_T$ output from the DC generator circuit 110a.

When the switch SW is on, a constant-current is supplied from the constant-current source 111 to the NMOS transistor M101. The NMOS transistor M101 generates a voltage between the gate and source according to the constant-current. When the current supplied from the constant-current source 111 is a very low, for example, not more than 1 μA, the NMOS transistor M101 is in the state of the boundary of on and off. Specifically, the voltage between the gate and source of the NMOS transistor M101 is almost equal to the threshold voltage. This is on the basis of the theory that in general the characteristic of a MOS transistor is represented by $I_D=\beta(V_{GS}-V_{th})^2$, and the low current $I_D$ makes the voltage $V_{GS}$ between the gate and source almost equal to the threshold voltage $V_{th}$. Therefore, this voltage can be used as the diode bias voltage of the rectifier circuit 120.

The DC generator circuit 110a is operated intermittently by the switch SW. The switch SW is turned off to reduce the power consumption while the DC voltage output from the DC generator circuit 110a is not required. The clock pulses output from the clock generator circuit 130 can be used for the ON/OFF control of this switch SW. For example, in case that the control terminal of the switch SW is connected to the output terminal BC of the clock generator circuit 130 shown in FIG. 4 and the switch SW is turned on for the input of a logic "low", the DC generator circuit 110a can output the DC voltage $V_T$ in synchronization with the timing that each of the clock generator circuit 130 and the bias circuits 100a and 100b requests the constant DC voltage $V_T$.

It is not necessary that the switch SW be always on during the clock pulse of a logic "high". The switch SW may be turned on only during a specific period of the clock pulse of a logic "high".

Figure 7:
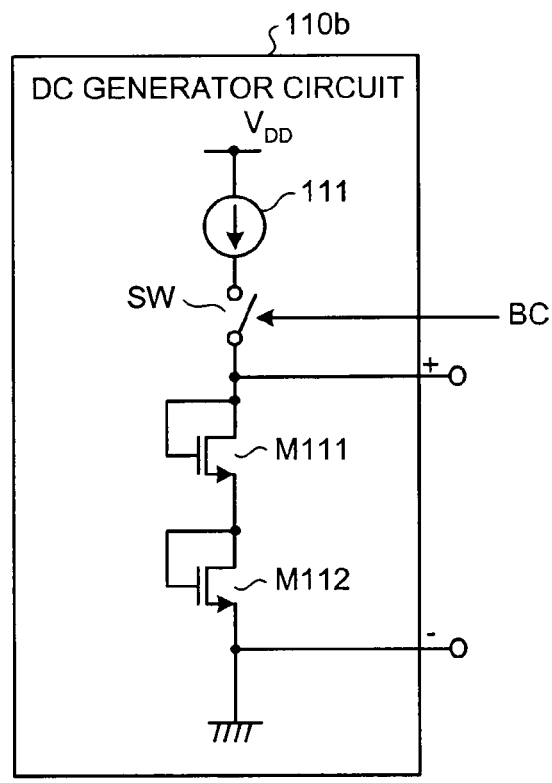
FIG. 7 is a circuit diagram of another example of the DC generator circuit.

FIG. 7 is a circuit diagram of another example of the DC generator circuit 110. The DC generator circuit 110b shown in FIG. 7 includes two NMOS transistors M111 and M112, each of which has a gate and a drain connected to each other, and the constant-current source 111 that generates a constant-current as that in FIG. 6. The NMOS transistors M111 and M112 are connected in series. The output terminal of the constant-current source 111 and the drain of the NMOS transistor M111 are connected to each other through the switch SW. The sum of the voltage between the gate and source of the NMOS transistor M112 and the voltage between the gate and source of the NMOS transistor M111 corresponds to the DC voltage $V_T$ output from the DC generator circuit 110b.

In the DC generator circuit 110b, each threshold voltage of the NMOS transistors M111 and M112 is smaller than each threshold voltage of the NMOS transistors M1 and M2 of the rectifier circuit 120, and the threshold voltage of the NMOS transistor Md5 of the clock generator circuit 130, and is a level such that the sum of the gate-source voltages becomes equal to the DC voltage $V_T$. Thus, even if the voltage source which includes the MOS transistor having a threshold lower than that of the NMOS transistors M1, M2, and Md5 is used, the DC generator circuit 110a can be utilized without influence of the manufacturing difference.

The DC generator circuit 110 formed as described above is preferably integrated in an IC chip together with the NMOS transistors M1 and M2 used in the rectifier circuit 120. In general, the differences in the threshold voltage of the MOS transistors between lots or between wafers ranges from approximately −100 mV to +100 mV. When each of the DC generator circuit 110 and the rectifier circuit 120 is formed in a different chip, there is a possibility that the threshold voltage generated by the DC generator circuit 110 is different from the threshold voltage of the MOS transistor in the rectifier circuit 120 by 100 mV. In contrast, the differences in the threshold voltage of the MOS transistors in the same chip ranges from approximately −10 mV to 10 mV. In this case, the difference between the threshold voltage generated by the DC generator circuit 110 and the threshold voltage of the MOS transistor in the rectifier circuit 120 is few.

Moreover, the DC generator circuit 110 preferably uses a transistor with the same shape as the MOS transistor (especially, the MOS transistor M1 or M2 of the diode circuit) of the rectifier circuit 120. Even in case of a transistor with a different shape, the transistor desirably has a scalable shape in a ratio of the gate width to the gate length.

According to the rectifier circuit according to the first embodiment as described above, the bias circuit applies a constant voltage between the gate and source of the diode-connected MOS transistor, where the constant voltage is less than a threshold level required for rectification of the MOS transistor, preferably near the threshold level. As a result, it is possible to rectifier an AC signal with a root-mean-square value less than the threshold level of the MOS transistor.

Figure 8:
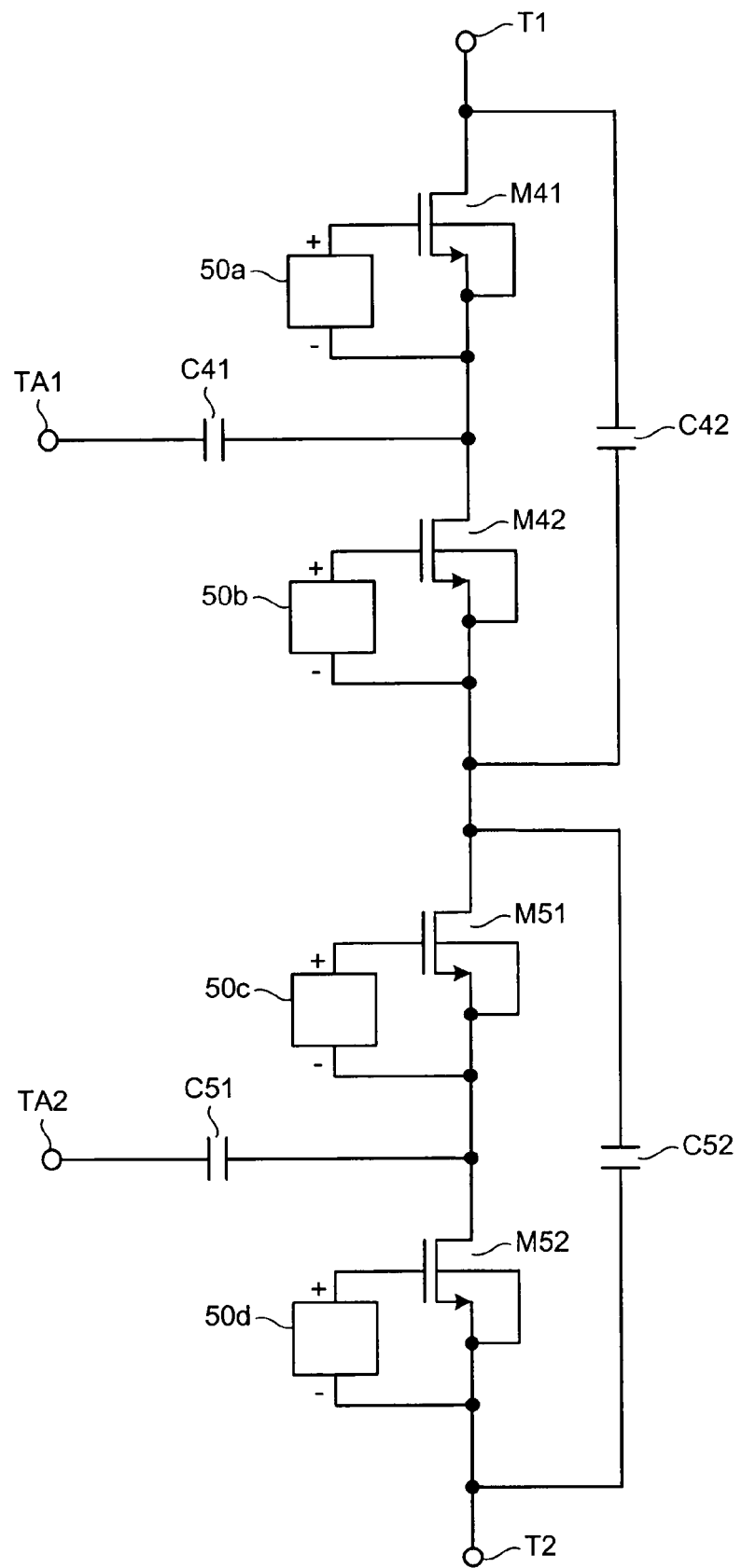
FIG. 8 is a circuit diagram of a part of a rectifier circuit according to a second embodiment.

FIG. 8 is a circuit diagram of a part of a rectifier circuit (diode circuit) according to a second embodiment. A diode circuit shown in FIG. 8 includes two stacking diode circuits, each of which corresponds to the diode circuit shown in FIG. 1. NMOS transistors M41 and M51 each correspond to the NMOS transistor M1, and NMOS transistors M42 and M52 each correspond to the NMOS transistor M2. Capacitors C41 and C51 each correspond to the capacitor C1, and capacitors C42 and C52 each correspond to the capacitor C2. Moreover, each of bias circuits 50a, 50b, 50c, and 50d is the same circuit as the bias circuit 10a or 10b shown in FIG. 1.

A differential AC signal is input to a positive signal input terminal TA1 connected to one end of the capacitor C41 and a negative signal input terminal TA2 connected to one end of the capacitor C51. These positive signal input terminal TA1 and negative signal input terminal TA2, when the rectifier circuit according to this embodiment is used in the RFID tag, are connected to both ends of the loop antenna, respectively.

Each of the bias circuit 50a, 50b, 50c, and 50d shown in FIG. 8 corresponds to the bias circuit shown in FIG. 2 as that in the first embodiment. The rectifier circuit using the bias circuits can have the same structure as that shown in FIG. 3. It should be noted that the rectifier circuit according to the second embodiment may have a structure that more than two diode circuits are stacked.

Therefore, the rectifier circuit according to the second embodiment has the same advantages as that of the rectifier circuit according to the first embodiment.

A rectifier circuit according to a third embodiment uses as a rectifying device a floating gate field-effect transistor which is diode-connected. In particular, the floating gate is charged by a constant voltage which is less than a threshold level required for rectification of the floating gate field-effect transistor, preferably near the threshold level.

Figure 9:
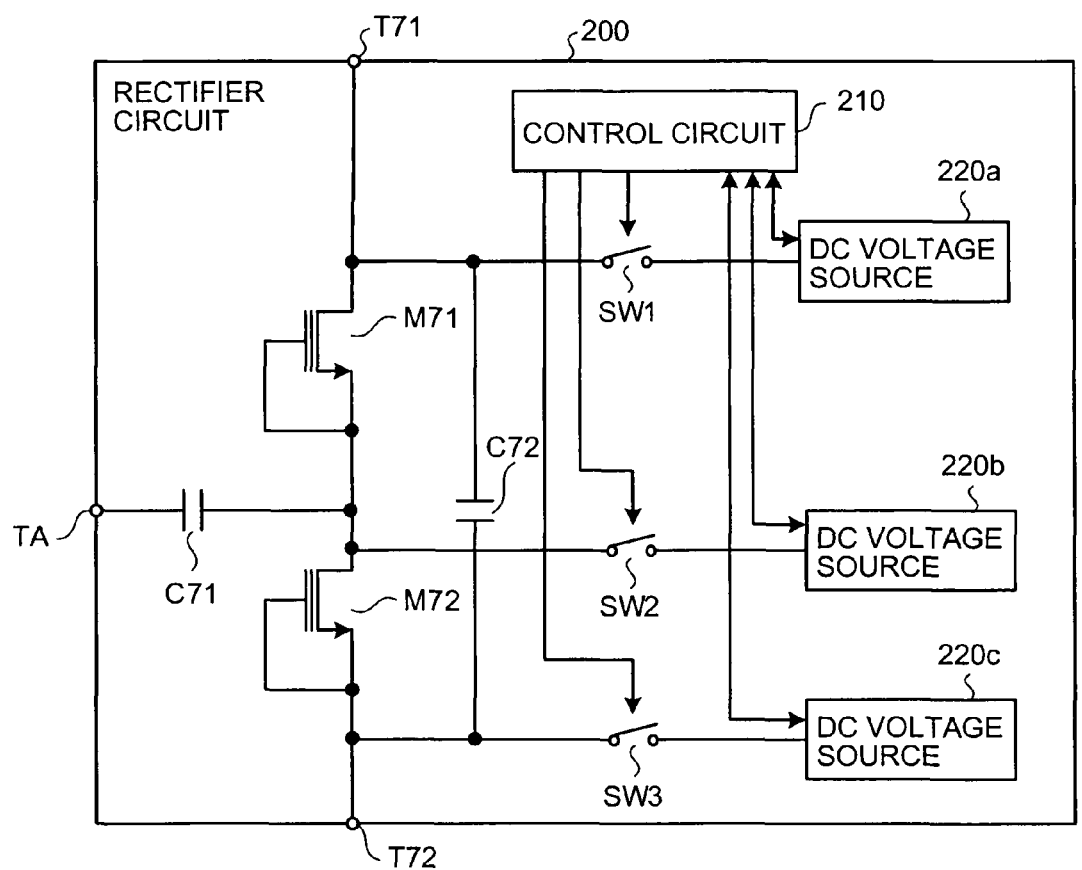
FIG. 9 is a circuit diagram of a rectifier circuit according to a third embodiment.

FIG. 9 is a circuit diagram of a rectifier circuit according to a third embodiment. The rectifier circuit 200 shown in FIG. 9 includes a floating gate field-effect transistor M71 whose control gate and drain which are connected to each other, and the drain is connected to a positive terminal T71. Moreover, the floating gate of the floating gate field-effect transistor M71 is charged by a voltage (hereinafter, diode bias voltage) required for rectification of the floating gate field-effect transistor M71. Here, suppose that the diode bias voltage is equal to the threshold level of the floating gate field-effect transistor M71. As a result, the threshold level of the floating gate field-effect transistor M71 becomes essentially zero, and it is possible to rectify all AC signals including the AC signal with a root-mean-square value not more than the threshold level.

The rectifier circuit 200 also includes a floating gate field-effect transistor M72 whose control gate and drain which are connected to each other, and the drain is connected to a negative terminal T72. The floating gate of the floating gate field-effect transistor M72 is charged by the diode bias voltage. This floating gate field-effect transistor M72 as well as the floating gate field-effect transistor M71 has the characteristic of rectification.

The source of the floating gate field-effect transistor M71 and the drain of the floating gate field-effect transistor M72 are connected to each other, and a line connecting them is connected to one end of a capacitor C71. The other end of the capacitor C71 is connected to a signal input terminal TA. This capacitor C71 functions as a coupling capacitor. When the rectifier circuit 200 according to this embodiment is used in an RFID tag, the capacitor C71 is connected to the loop antenna, and functions as a series resonance capacitor.

A capacitor C72 is connected between the drain of the floating gate field-effect transistor M71 and the source of the floating gate field-effect transistor M72. The signal half-wave rectified by the floating gate field-effect transistors M71 and M72 is smooth through the capacitor C72. This smoothing allows the output of a DC voltage from both ends of the capacitor C72, that is, between the positive terminal T71 and the negative terminal T72.

In particular, the diode circuit, which includes the floating gate field-effect transistors M71 and M72, and the capacitors C71 and C72, can rectify a weak AC signal with an amplitude of approximately 100 mV, which is difficult to rectify by conventional rectifier circuits. Therefore, an RFID tag which uses the rectifier circuit 200 can rectify a weak electric wave. In other words, the RFID tag, even when located away from a base station, can carry out rectification and long distance communication.

The rectifier circuit 200 further includes switches SW1, SW2, and SW3, a control circuit 210, and DC voltage sources 220a, 220b, and 220c. These components are for charge and discharge to the floating gate field-effect transistors M71 and M72. One end of the switch SW1 is connected to the drain of the floating gate field-effect transistor M71. The other end is connected to the output terminal of the DC voltage source 220a. One end of the switch SW2 is connected to the drain of the floating gate field-effect transistor M72. The other end is connected to the output terminal of the DC voltage source 220b. One end of the switch SW3 is connected to the source of the floating gate field-effect transistor M72. The other end is connected to the output terminal of the DC voltage source 220c. The switches SW1, SW2, and SW3 are connected to the control circuit 210 which controls switching of the switches. The DC voltage sources 220a, 220b, and 220c are also connected to the control circuit 210, sets various operation modes or the voltage to be output based on a control signal output from the control circuit 210.

Figure 10:
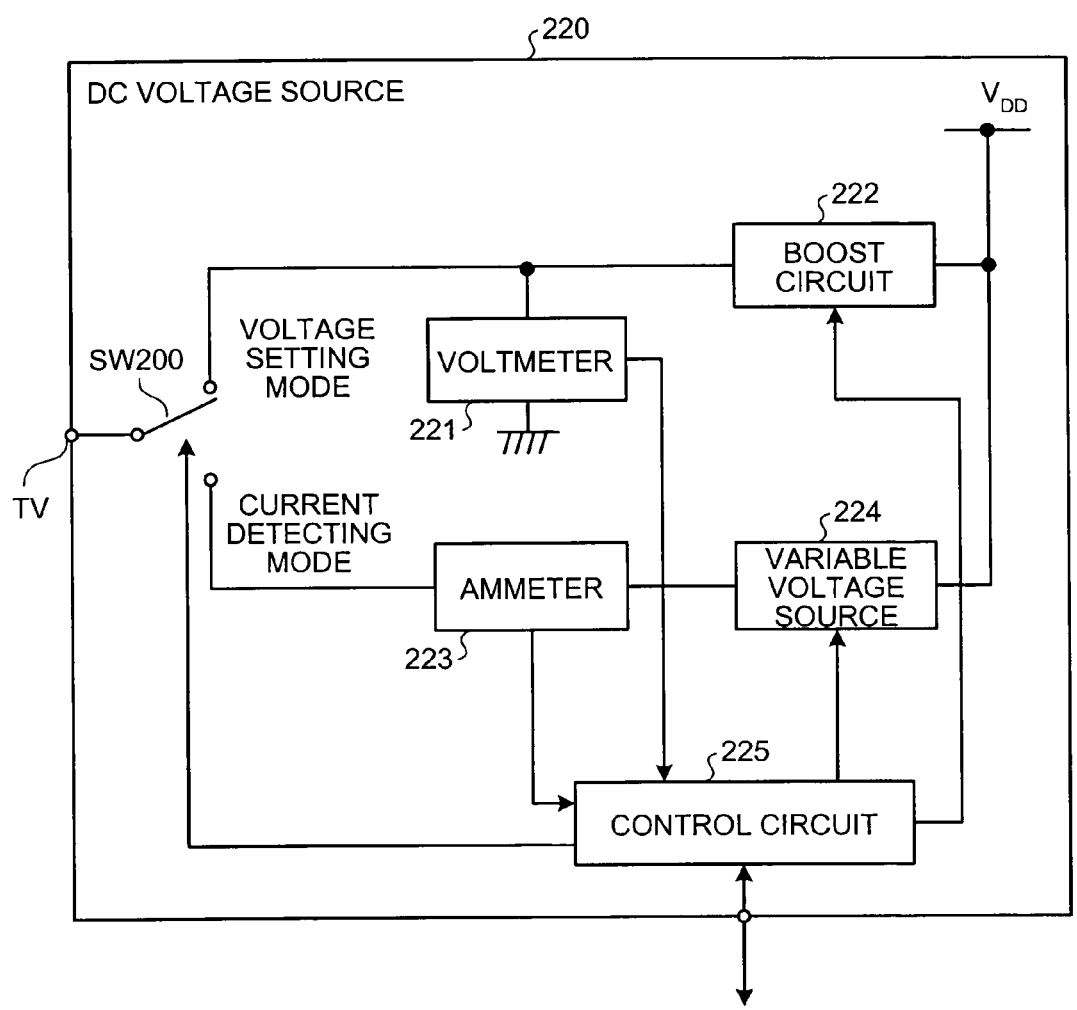
FIG. 10 is a block diagram of a DC voltage source of the rectifier circuit according to the third embodiment.

FIG. 10 is a circuit diagram of a DC voltage source 220 of being an example of the DC voltage sources 220a, 220b, and 220c. The DC voltage source 220 shown in FIG. 10 includes a switch SW200 that changes two operation modes, a voltage setting mode and an current detecting modes. The DC voltage source 220 further includes a voltmeter 221, a boost circuit 222, an ammeter 223, and a variable voltage source 224 and a control circuit 225. The voltmeter 221 and boost circuit 222 are connected to one end of the switch SW200 for selecting the voltage setting mode. The variable voltage source 224 is electrically connected to the other end of the switch SW200 for selecting the current detecting mode via the ammeter 223. The control circuit 225 controls the switch SW200 and the voltages set to the boost circuit 222 and the variable voltage source 224 based on the control signal output from the control circuit 210 of the rectifier circuit 200, and transmits the signals indicating a voltage value measured by the voltmeter 221 and a current value measured by the ammeter 223 to the control circuit 210.

Figure 11:
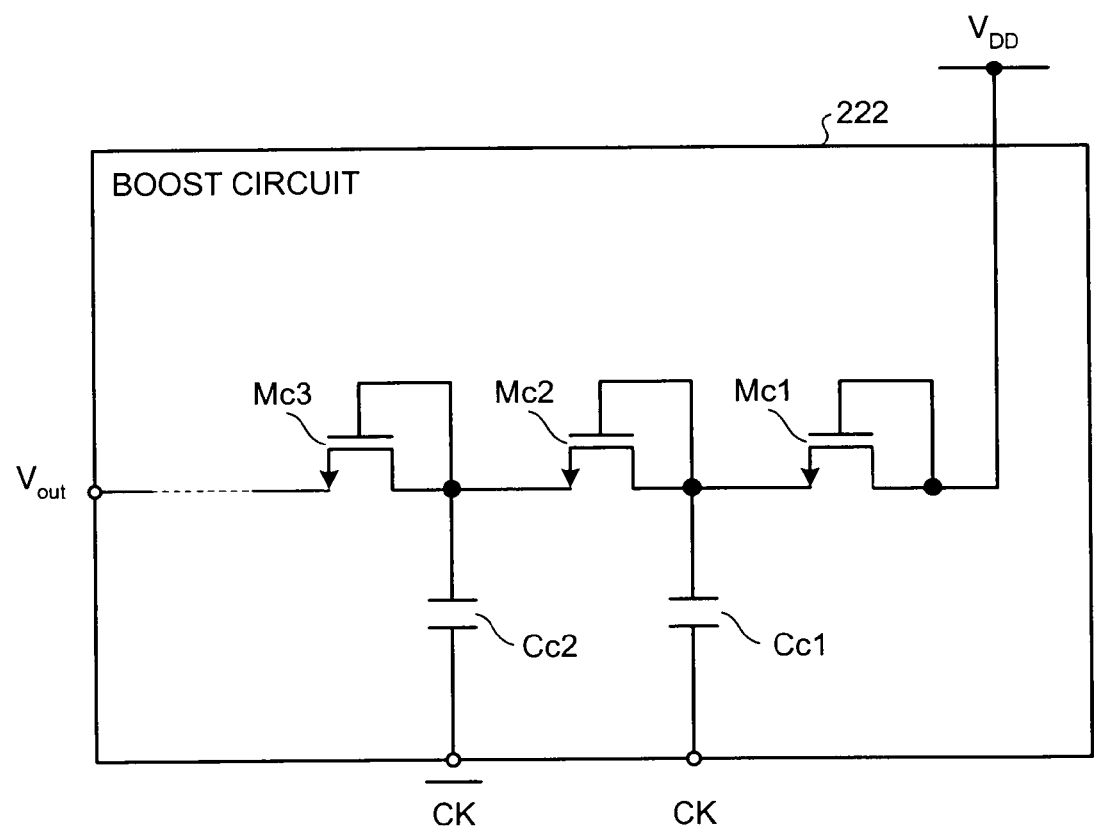
FIG. 11 is a circuit diagram of a boost circuit of the DC voltage source.

FIG. 11 is a circuit diagram of an example of the boost circuit 200 of the DC voltage source 200. The boost circuit 222 shown in FIG. 11 is a general charge pump circuit. The charge pump circuit accepts clock pulses CK through a capacitor Cc1 connected between transistors Mc1 and Mc2, and accepts clock pulses/CK of the inverse of the clock pulse CK through a capacitor Cc2 connected between transistors Mc2 and Mc3. The dotted line in FIG. 11 represents the repetition of these components. The power supply voltage VDD shifts by accepting the clock pulses while stepping up toward an output terminal $V_{OUT}$. If the charge pump circuit includes n transistors, the voltage output from the output terminal VOUT is represented by $(N+1)(V_{DD}-V_{th})$, where $V_{th}$ is a threshold level of the transistors. A voltage of approximately 10 V can be supplied for setting the potential of the floating gate by the boost circuit 222.

Figure 12:
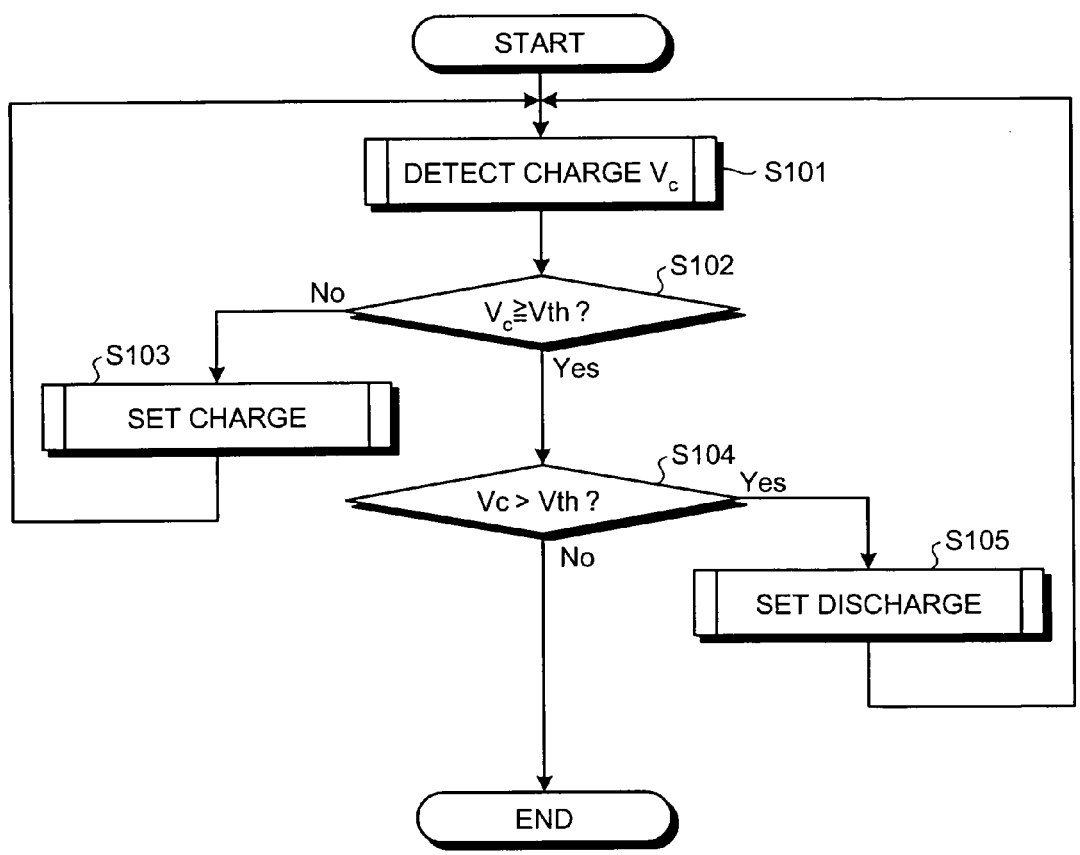
FIG. 12 is a flow chart of control of a floating gate.
Figure 13:
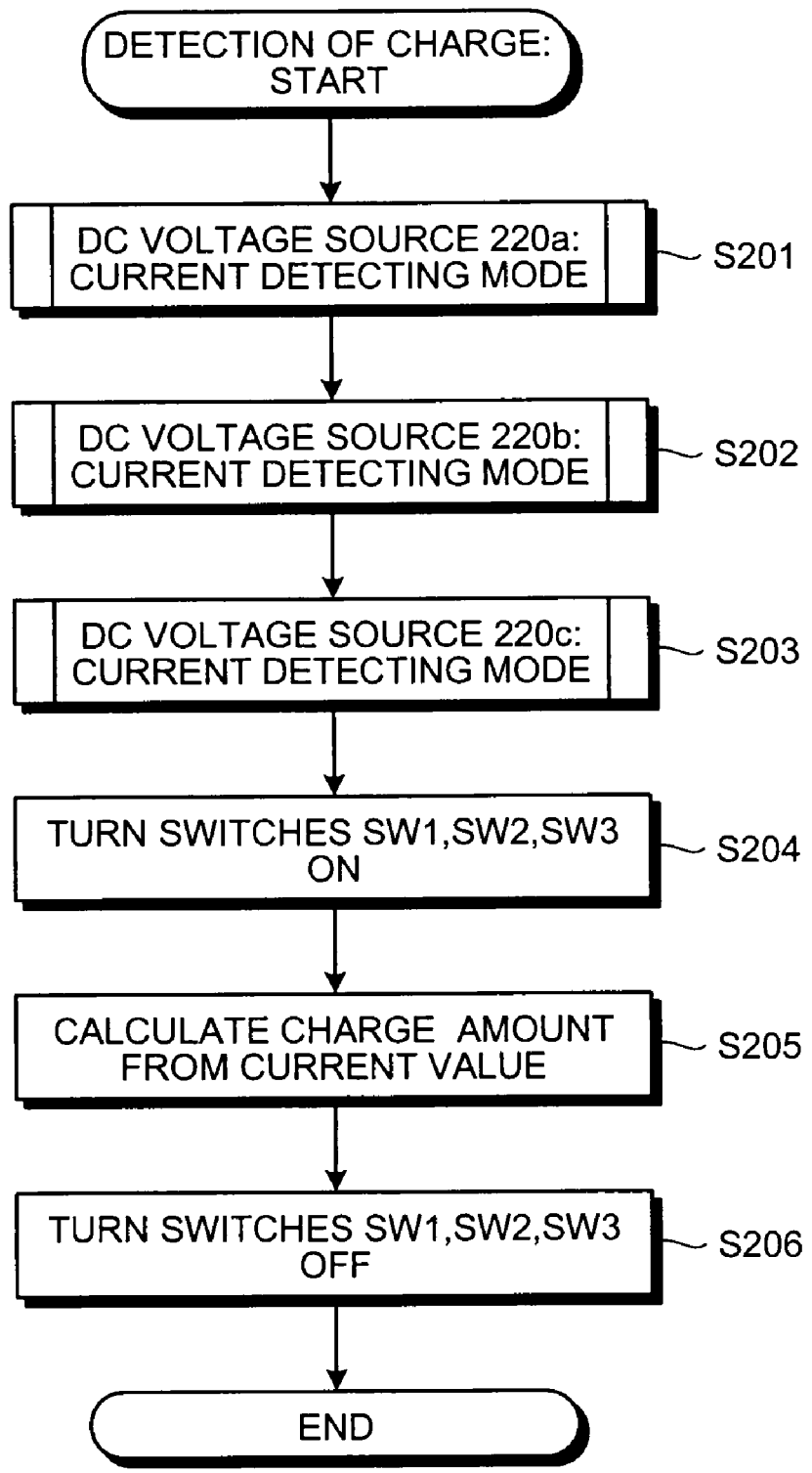
FIG. 13 is a flow chart of a charge amount detection process.

The control of the floating gate of the floating gate field-effect transistors M71 and M72 will be described below. FIG. 12 is a flow chart of control of the floating gate. The amount of the charge on each floating gate of the floating gate field-effect transistors M71 and M72 is first detected (step S101). FIG. 13 is a flow chart of a charge amount detection process. The control circuit 210 of the rectifier circuit 200 transmits a control signal to each control circuit 225 of the DC voltage sources 220a to 220c prior to detecting the amount of charge. The control signal indicates a request for switching to the current detecting mode and a voltage value to be set to each variable voltage source 224 (steps S201 to S203). Besides, the control circuit 210 of the rectifier circuit 200 turns on the switches SW1 to SW3 (step S204).

Figure 14:
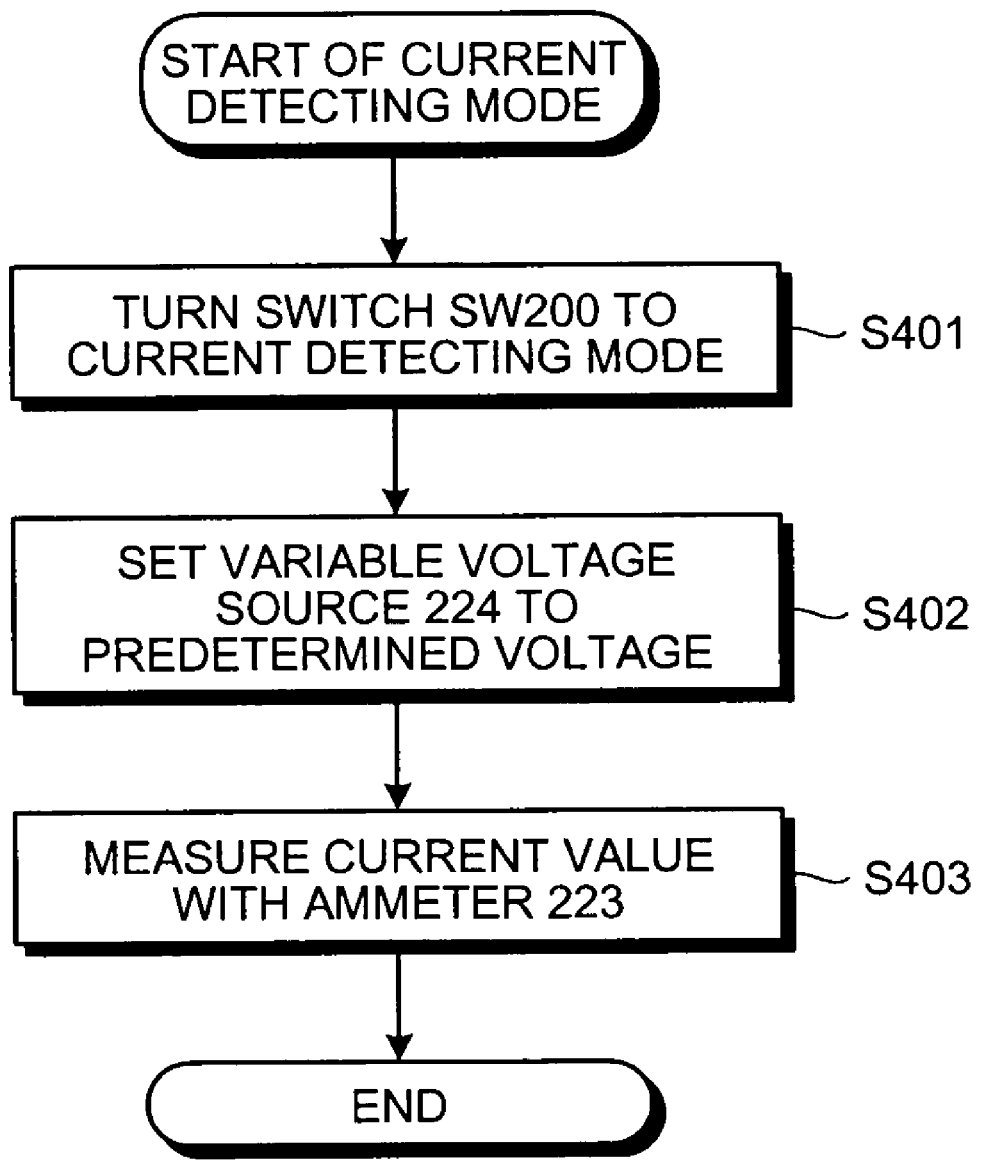
FIG. 14 is a flow chart of operation of a current detecting mode in the DC voltage source.

FIG. 14 is a flow chart of operation of the current detecting mode in the DC voltage source 220. The control circuit 225 of the DC voltage source 220 receives the control signal from the control circuit 210 of the rectifier circuit 200, switches to the current detecting mode with the switch SW200 (step S401), and sets the voltage to the variable voltage source 224 (step S402). For example, to check the amount of charge on the floating gate of the floating gate field-effect transistor M71, the variable voltage source 224 of the DC voltage source 220a is set to one volt, and the variable voltage source 224 of the DC voltage source 220b is set to zero volt. Next, the current value is measured with the ammeter 223 of each DC voltage source 220 (step S403). This current value is actually measured after step S204.

The control circuit 210 of the rectifier circuit 200 receives each current value measured in the DC voltage sources 220a, 220b, and 220c, calculates a voltage $V_c$ corresponding to the amount of charge from each current value (step S205), and turns off the switches SW1 to SW3 (step S206).

After that, the control circuit 210 determines whether the calculated voltage $V_c$ is not less than a threshold level $V_{th}$ (step S102). For this determination, setting the voltage applied to the source of the floating gate field-effect transistor to a level higher than the voltage applied to the drain is necessary, as well as the example of setting the voltages described above: one volt to the variable voltage source 224 of the DC voltage source 220a, zero volt to the variable voltage source 224 of the DC voltage source 220b. For example, it is determined that the voltage $V_c$ of the floating gate of floating gate field-effect transistor M71 is not less than the threshold level $V_{th}$ of the floating gate field-effect transistor M71 when the current flows between the source and drain of the floating gate field-effect transistor M7, i.e., when the current value obtained from DC voltage source 220a is high. When the voltage $V_c$ is less than the threshold level $V_{th}$, i.e., when the current value obtained from source 220a is zero or sufficiently low (step S102: No), the floating gate of the floating gate field-effect transistor M71 is charged (step S103). Prior to this charge setting, a difference voltage between the voltage of the floating gate and the threshold level is calculated. This difference voltage is calculated by repeating detecting the amount of charge as described above. For example, when a difference voltage between the voltage of the floating gate of floating gate field-effect transistor M71 and its threshold level is calculated, the variable voltage source 224 of the DC voltage source 220a is set to zero volt, and the variable voltage source 224 of the DC voltage source 220b is set to 0.5 volt. Next, the switches SW1 and SW2 are turned on, and the current value obtained from the DC voltage source 220b is checked.

In this case, a gate voltage $V_g$ applied to the channel of the floating gate field-effect transistor M71 is represented by $V_g = V_f + 0.5$, where $V_f$ is the voltage value of the floating gate. At this state, the current value that flows through the DC voltage source 220b is proportional to $(V_g - V_{th})^2 = (V_f + 0.5 - V_{th})^2$. When the current value at this time is high, the variable voltage source 224 of the DC voltage source 220b is set to a level lower than 0.5 volt. When the current value is zero or sufficiently low, the variable voltage source 224 of the DC voltage source 220b is set to a level higher than 0.5 volt. Thus, the difference voltage between the voltage value of the floating gate and the threshold level is calculated by reading the voltage value at the border of the current. Based on this difference voltage, a voltage to be set to the boost circuit 222 of the DC voltage source 200 is decided.

Figure 15:
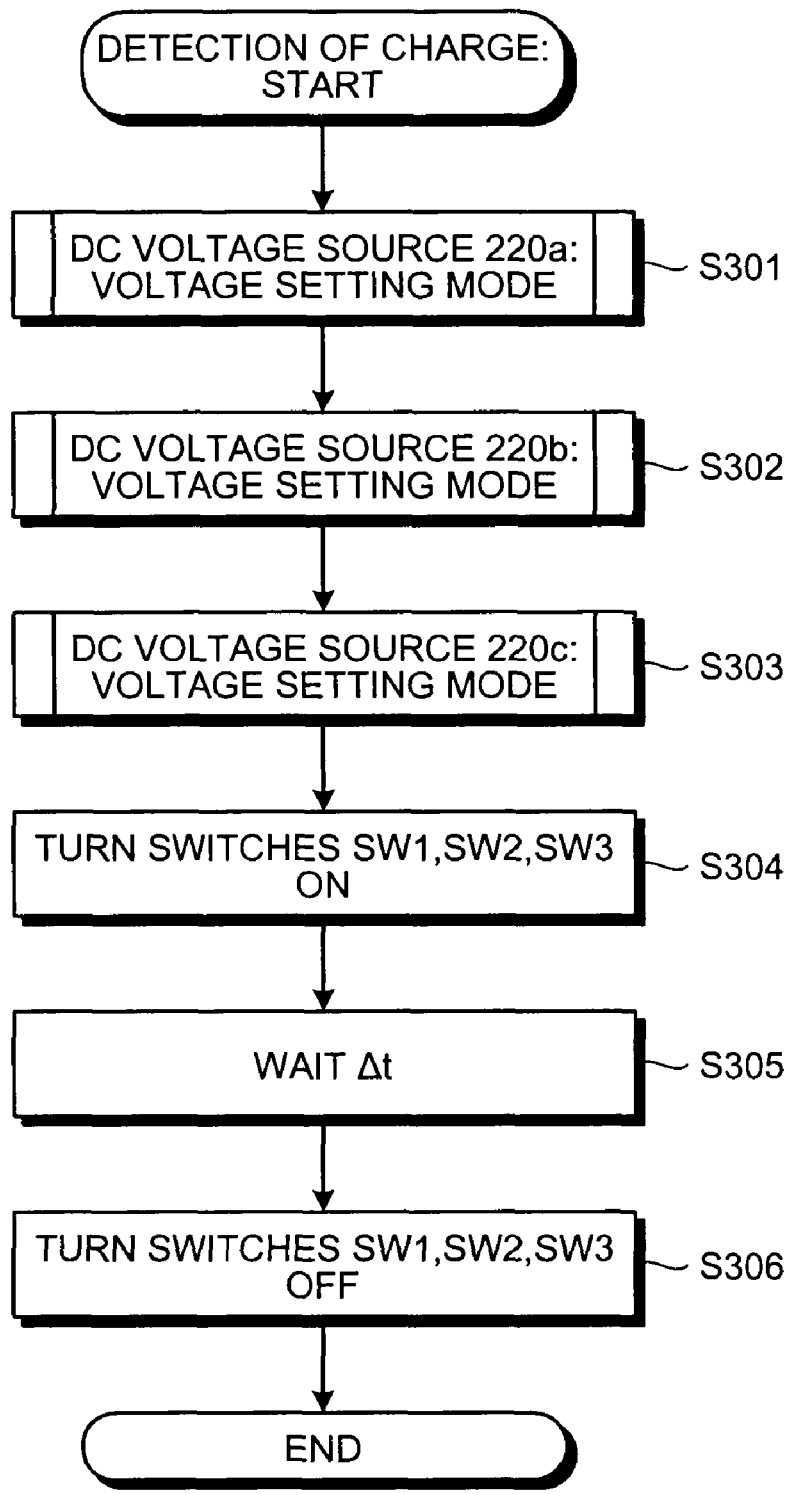
FIG. 15 is a flow chart of a charge amount setting process.

FIG. 15 is a flow chart of a charge amount setting process. The control circuit 210 of the rectifier circuit 200 transmits a control signal to each control circuit 225 of the DC voltage sources 220a to 220c. The control signal indicates a request for switching to the voltage setting mode and a voltage value to be set to each boost circuit 222 (steps S301 to S303). Besides, the control circuit 210 of the rectifier circuit 200 turns on the switches SW1 to SW3 (step S304).

Figure 16:
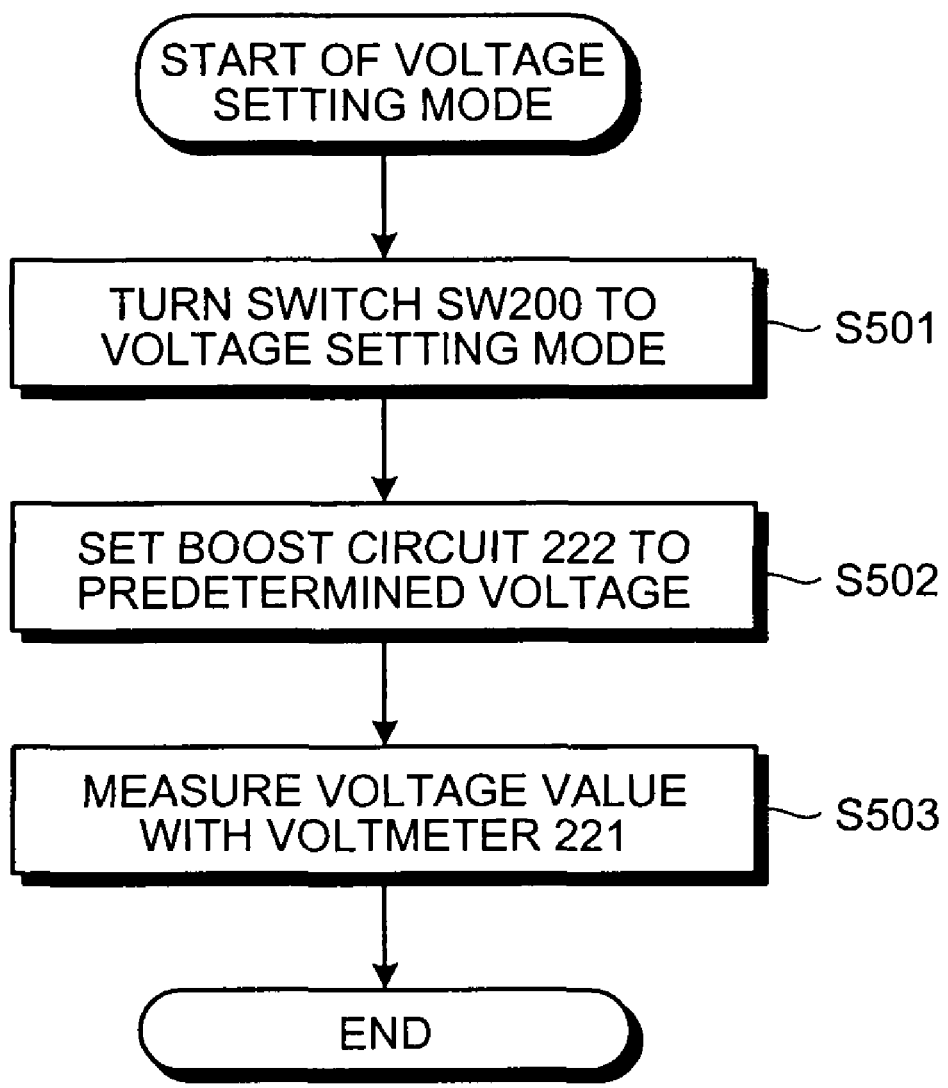
FIG. 16 is a flow chart of operation of a voltage setting mode in the DC voltage source.

FIG. 16 is a flow chart of operation of the voltage setting mode in the DC voltage source 220. The control circuit 225 of the DC voltage source 220 receives the control signal from the control circuit 210 of the rectifier circuit 200, switches to the voltage setting mode with the switch SW200 (step S501), and sets the voltage to the boost circuit 222 (step S502). For example, to charge the floating gate of the floating gate field-effect transistor M71, the boost circuit 222 of the DC voltage source 220a is set to a high voltage, and the boost circuit 222 of the DC voltage source 220b is set to zero volt. The voltage value of the floating gate of the floating gate field-effect transistor M71 is measured with the voltmeter 221 of each DC voltage source 220 (step S503). This voltage value is actually measured after step S304.

The control circuit 210 of the rectifier circuit 200 applies a high voltage to turns off high voltage to the floating gate of the floating gate field-effect transistor M71 for a time Δt by using the boost circuit 222 (step S305), following by turning off the switches SW1 to SW3 (step S306). The time Δt is defined as a time that enables the floating gate to be charged without saturation.

When the voltage $V_c$ is not less than the threshold level $V_{th}$ at step S102, i.e., when the current value obtained from the DC voltage source 220a is high (step S102: Yes), whether the voltage $V_c$ is more than the threshold level $V_{th}$ is determined (step S104). When the voltage $V_c$ is more than the threshold level $V_{th}$ (step S104: Yes), rectification efficiency decreases since the floating gate field-effect transistor M71 is always on. To avoid this state, the floating gate is discharged (step S105).

The setting of discharge can be achieved by the same process as setting of the amount of charge as shown in FIG. 15. For example, to discharge the floating gate of the floating gate field-effect transistor M71, the boost circuit 222 of the DC voltage source 220a is set to zero volt, and the boost circuit 222 of the DC voltage source 220b is set to a high voltage, following by turning on the switches SW1 and SW2. As a result, the electrons held in the source of the floating gate field-effect transistor M71 is injected to the floating gate to decrease the charge on the floating gate.

When the voltage $V_c$ is not more than threshold level $V_{th}$ at step S104 (step S104: No), i.e., when the voltage $V_c$ is equal to the threshold level $V_{th}$, the control of the floating gate is ended.

Though the floating gate field-effect transistor M71 is taken as a floating gate field-effect transistor, the same is for the floating gate field-effect transistor M72. The threshold level of each floating gate field-effect transistor may be set to a high potential. In this case, a weak radio signal cannot be rectified. In particular, when this rectifier circuit 200 is applied to an RFID tag, only the RFID tag near a base station can be subject to the rectification operation. It is also possible to control the communication distance based on the amount of charge to the floating gate, and thus the performance of the RFID tag can be changed in light of security, privacy, and long distance communication.

According to the rectifier circuit according to the third embodiment as described above, a constant voltage which is less than a threshold level required for rectification of the floating gate field-effect transistor, preferably near the threshold level, is held in the floating gate of the floating gate field-effect transistor. As a result, it is possible to rectifier an AC signal with a root-mean-square value less than the threshold level of the floating gate field-effect transistor.

Figure 17:
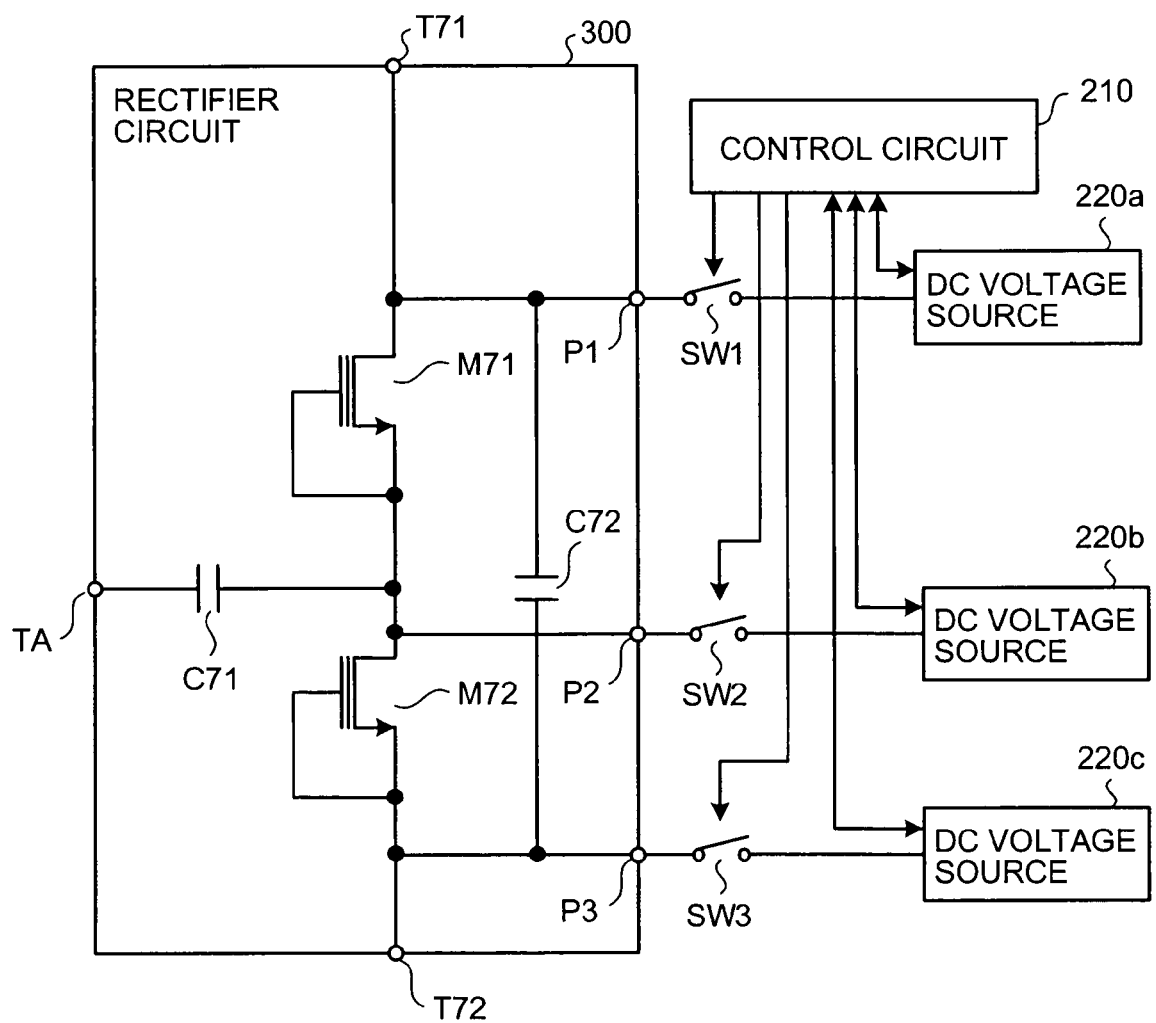
FIG. 17 is a circuit diagram of a rectifier circuit according to a fourth embodiment.

A rectifier circuit according to a fourth embodiment is a modification of the rectifier circuit 200 according to the third embodiment. In particular, the switches SW1 to SW3, the control circuit 210, and the DC voltage sources 220a to 220c are provided as external devices different from the rectifier circuit. FIG. 17 is a circuit diagram of a rectifier circuit according to a fourth embodiment. In a rectifier circuit 300 shown in FIG. 17, the same components as those in FIG. 9 are labeled by the same reference characters, and therefore, the explanation of the components will be omitted here.

The rectifier circuit 300 includes floating gate field-effect transistors M71 and M72, the capacitors C71 and C72, out of components of the rectifier circuit 200 shown in FIG. 9. The rectifier circuit 300 is also provided as an IC chip, and includes an electrode pad P1 connected to the drain of the floating gate field-effect transistor M71, an electrode pad P2 connected to the drain of the floating gate field-effect transistor M71, and an electrode pad P3 connected to the source of the floating gate filed-effect transistor M72. The electrode pads P1, P2, and P3 can be connected to respective ends of the switches SW1, SW2, and SW3.

The rectifier circuit 300 performs control of the floating gate (see FIG. 12) via the electrode pads P1 to P3 on the floating gates of the floating gate field effect transistors M71 and M72 only once at factory shipment for example. Since the floating gates are coated with an insulating material, the charge held once does not be released for a long time, thereby maintaining the same state. For example, retention of data stored in memory cells of EEPROM is guaranteed for at least ten years. Therefore, the rectifier circuit according to this embodiment can be used for several years without recharge after the floating gate is charged once.

Specifically, the user can use the RFID tag that includes the rectifier circuit 300 in a conventional manner and such an RFID can carry out long distance communication after the charge is set to the floating gate once at factory shipment.

A rectifier circuit according to a fifth embodiment is another modification of the rectifier circuit 200 according to the third embodiment. In particular, the rectifier circuit includes a capacitor connected between the control gate and source of each of the floating gate field-effect transistors M71 and M72, and the voltage retained in the capacitor is controlled.

Figure 18:
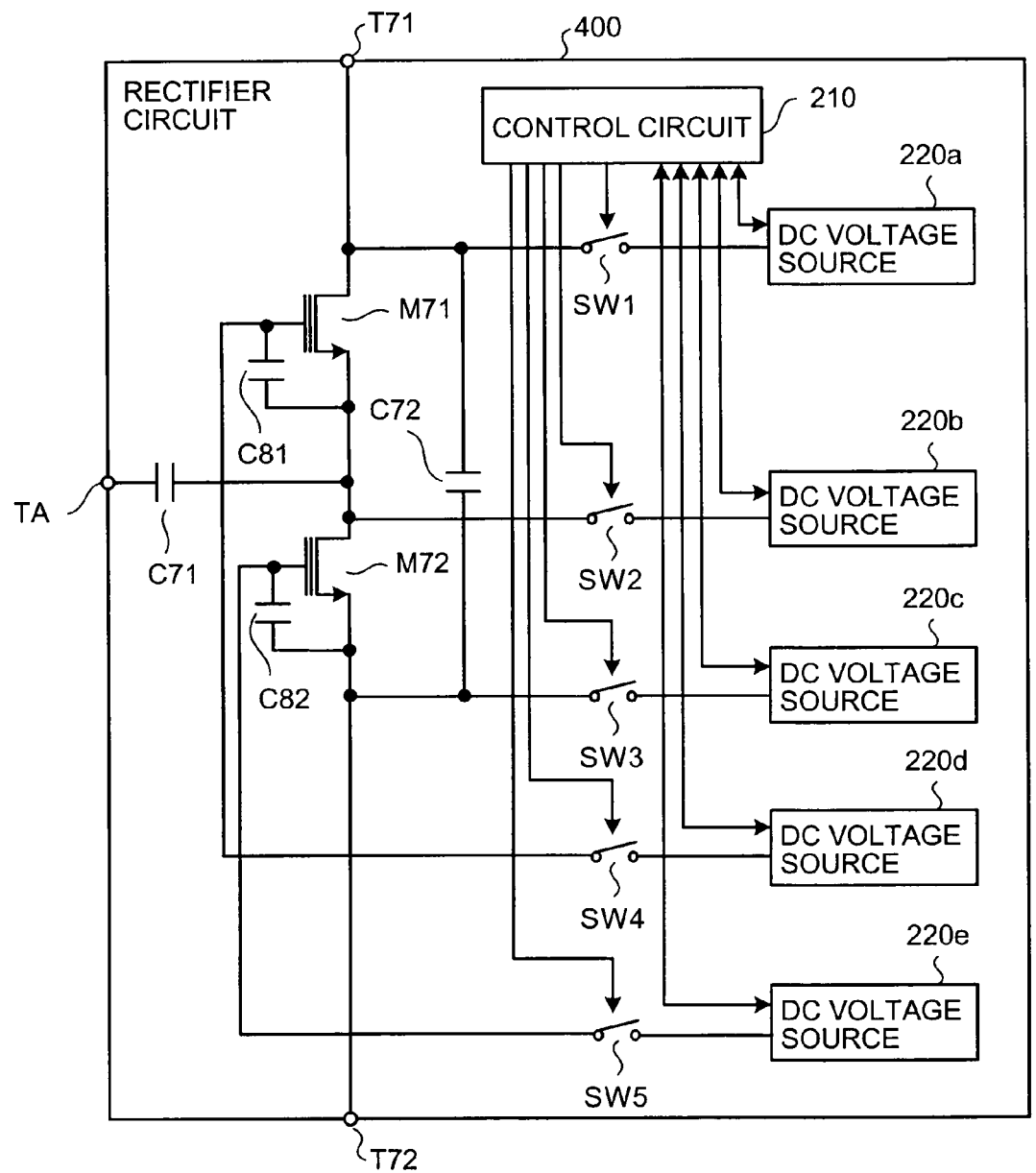
FIG. 18 is a circuit diagram of a rectifier circuit according to a fifth embodiment.

FIG. 18 is a circuit diagram of the rectifier circuit according to the fifth embodiment. In a rectifier circuit 400 shown in FIG. 18, the same components as those in FIG. 9 are labeled by the same reference characters, and therefore, the explanation of the components will be omitted here. The rectifier circuit 400 includes a capacitor C81 connected between the control gate and source of the floating gate field-effect transistor M71, a capacitor C82 connected between the control gate and source of the floating gate field-effect transistor M72, and DC voltage sources 220d and 220e, in addition to the components of the rectifier circuit 200 shown in FIG. 9. Moreover, a switch SW4 is connected between the control gate of the floating gate field-effect transistor M71 and the output terminal of the DC voltage source 220d, and a switch SW5 is connected between the control gate of the floating gate field-effect transistor M72 and the output terminal of the DC voltage source 220e. The DC voltage sources 220d and 220e, and switches SW4 and SW5 are controlled by the control circuit 210 as well as the other DC voltage sources 220a to 220c, and the switches SW4 and SW5. Each of the DC voltage sources 220d and 220e is the same as the DC voltage source 220 shown in FIG. 10.

According to such a configuration, various input voltages can be individually applied to each control gate of the floating gate field-effect transistors M71 and M72. It is possible to adjust to any level an input signal voltage which is necessary for turning on floating gate field-effect transistors M71 and M72, in other words, an input signal voltage which is required for rectification of the floating gate field-effect transistors M71 and M72.

Figure 19:
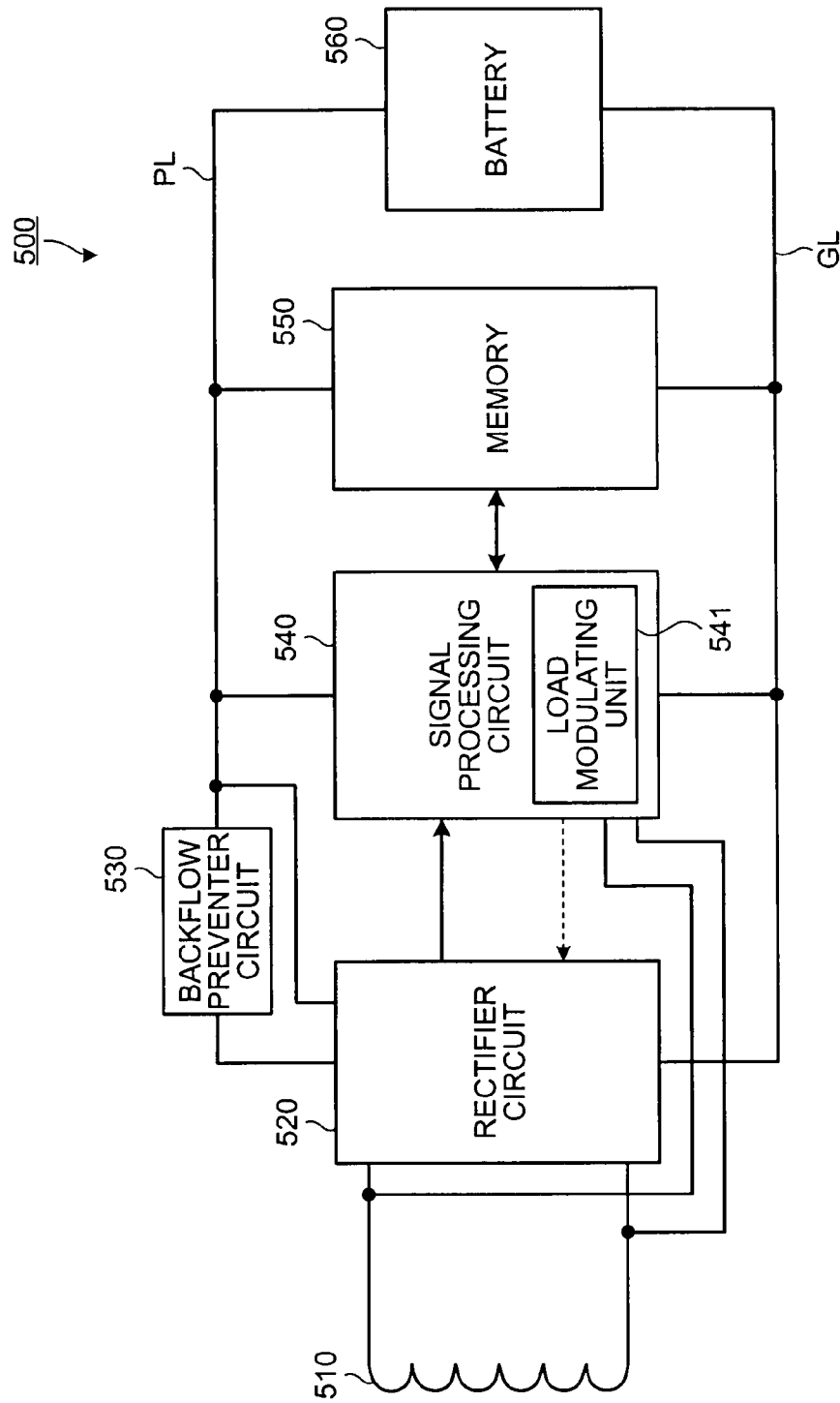
FIG. 19 is a block diagram of an RFID tag according to a sixth embodiment.

A sixth embodiment is an example of a communication device using the rectifier circuit according to any one of the first to fifth embodiments. In particular, an RFID tag will now be explained as an example of the communication device. FIG. 19 is a block diagram of an RFID tag according to the sixth embodiment. An RFID tag 500 shown in FIG. 19 includes a loop antenna 510, a rectifier circuit 520 that is the same as the rectifier circuit according to any one of the first to fifth embodiments, a backflow preventor circuit 530, a signal processing circuit 540, a memory 550, and a battery 560 that is a secondary cell. In particular, the RFID tag 500 is operated by a power-supply voltage supplied from the battery 560, and it is not always necessary to generate a power-supply voltage from the rectifier circuit 200 for its operation. Specifically, the rectifier circuit 520, the backflow preventor circuit 530, the signal processing circuit 540, and the memory 550 are connected to a power supply line PL and a grounding line GL which extend from the battery 560.

The loop antenna 510 induces an alternating-current in its antenna line according to magnetic flux variation generated by a reader/writer (not shown in the figure). This alternating-current is input to the signal input terminal of the rectifier circuit 520. The rectifier circuit 520 operates at the power-supply voltage supplied from the battery 560. Therefore, the DC generator circuit of the rectifier circuit 520 generates a desired voltage from the power-supply voltage supplied from the battery 560 as well as operates at the power-supply voltage. Specifically, the diode bias voltage is always applied between the gate and source of the MOS transistor constituting the diode circuit, regardless of whether an alternating-current is supplied from the loop antenna 510 to the rectifier circuit 520. The diode bias voltage may be applied based on an external trigger. Therefore, the rectifier circuit 520 can rectify a weak alternating-current induced in the loop antenna 510 with a root-mean-square value of less than approximately 0.7 V, as described in the first to fifth embodiments. In other words, it is possible to demodulate the weak data signal received by the loop antenna 510. The demodulated data signal is transmitted to the signal processing circuit 540. The DC voltage obtained by the rectifier circuit 520 is supplied to the battery 560 as an electric power for charge through the backflow preventor circuit 530.

The signal processing circuit 540 reads out data stored in the memory 550 based on the data signal received from the rectifier circuit 520 and writes data in the memory 550. The stored data is, for example, tag identification information. The signal processing circuit 540 includes a load modulating unit 541 connected to the loop antenna 510. The data read out from the memory 550 is transmitted to the reader/writer by modulating an electric current flowing in the loop antenna 510 with the load modulating unit 541. Concretely, the load modulation part 541 generates a demagnetizing field in the loop antenna 510. The demagnetizing field makes a slight change in the current that flows in the reader/writer's antenna. This slight change is detected by the reader/writer, and identified as a data signal. The clock generator circuit 130 as shown in FIG. 4 may be provided in signal processing circuit 540 or the rectifier circuit 520.

Figure 20:
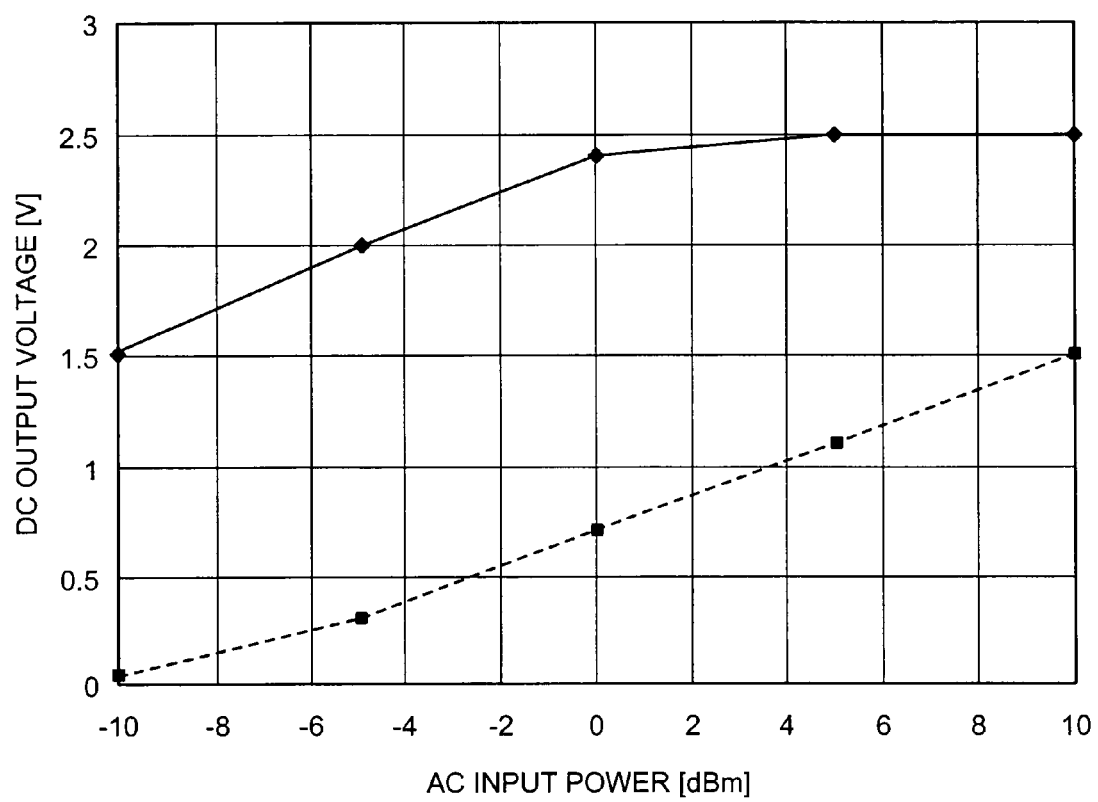
FIG. 20 is a graph where rectification properties of the RFID tag according to the sixth embodiment (solid line) and of a conventional RFID tag (broken line) are shown.

FIG. 20 is a graph where rectification properties of the RFID tag according to the sixth embodiment (solid line) and of a conventional RFID tag (broken line). The RFID tag according to this embodiment can generate a DC output voltage of 1.5 V even when receiving a weak AC signal (AC input power) of −10 dBm. This signal of −10 dBm corresponds to a distance of approximately 10 m between the RFID tag and the reader/writer. The DC output voltage becomes steady at high AC input powers as shown in the graph by a voltage limiter in the circuit. As can be seen from FIG. 20, the conventional RFID tag generates only a DC voltage of 0.05 V and the rectifier no longer serves as the rectifier circuit.

According to the RFID tag according to the sixth embodiment as described above, it is possible to identify a weak signal that cannot be rectified by the conventional RFID tag by the rectifier circuit according to any one of the first to fifth embodiments. This means the distance between the RFID tag and the reader/writer required for identification of the RFID tag is greatly expanded. As a result, the RFID system can have wide application. For example, one reader/writer can identify a lot of the RFID tags distributed within the range of tens to hundreds of meters almost at the same time. Accordingly, attachment of the RFID tag allows management of pastured farm animals and finding of a stray child and a wandering old person.

Moreover, since the RFID tag according to this embodiment includes the battery, it is easy to install various input/output devices, such as a temperature sensor, a speaker, a microphone, and a light emitting device, in the RFID tag. Such an RFID tag has a broader application. An RFID tag with a sensor have a structure shown in FIG. 21 for example. In the RFID tag 600 shown in FIG. 21, the same components as those shown in FIG. 19 are labeled by the same reference characters. The power supply system of an input/output device 570 included in the RFID tag 600 is connected to a power line PL line and a grounding line GL which extend from the battery 560. The signal processing circuit 540 transmits and receives signals to and from the input/output device 570. As an example of the input/output device 570 installed in the RFID tag, a temperature sensor will now be explained. The temperature sensor is in sleep and does not use power during no transmission of signal from a reader/writer (not shown in the figure). When the signal processing circuit 540 sends a request to the RFID tag with the temperature sensor based on a signal transmitted by the reader/writer, the temperature sensor is activated to detect temperature and then to transmit temperature data to the signal processing circuit 540. This temperature data and unique data of the RFID tag are transmitted from the RFID tag to the reader/writer. As another operation of the temperature sensor, the signal processing circuit 540 may send a request for output of temperature data to the temperature sensor at given time intervals to store the temperature data in the memory 550. And, the signal processing circuit 540, when receiving a request from the reader/writer, transmits the stored temperature data together with detection time data to the reader/writer. The temperature sensor may be activated by a trigger such as vibration, sound, and light to store the temperature data in the memory 550.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rectifier circuit, comprising:
   a first bias circuit that outputs a first direct-current voltage to charge a first capacitor based on a clock signal;
   a second bias circuit that outputs a second direct-current voltage to charge a second capacitor based on a clock signal;
   a first MOS transistor that has a gate and a source, the first direct-current voltage being applied between the gate and the source of the first MOS transistor to bias the gate of the first MOS transistor;
   a second MOS transistor that has a gate and a source, and a drain connected to the source of the first MOS transistor, the second direct-current voltage being applied between the gate and the source of the second MOS transistor to bias the gate of the second MOS transistor; and
   a coupling capacitor that has a first end which is connected to the source of the first MOS transistor, and a second end to which an alternating-current signal is input.

2. The rectifier circuit according to claim 1, wherein the first and second MOS transistors have a triple well structure on a semiconductor substrate.

3. The rectifier circuit according to claim 1, wherein the first MOS transistor has a backgate connected to the source of the first MOS transistor, and the second MOS transistor has a backgate connected to the source of the second MOS transistor.

4. The rectifier circuit according to claim 1, further comprising:
   a smoothing capacitor connected between the drain of the first MOS transistor and the source of the second MOS transistor.

5. The rectifier circuit according to claim 1, further comprising:
   a direct-current voltage generator circuit that generates a reference direct-current voltage, wherein the first bias circuit outputs the first direct-current voltage based on the reference direct-current voltage, and the second bias circuit outputs the second direct-current voltage based on the reference direct-current voltage.

6. The rectifier circuit according to claim 5, wherein the first and second MOS transistors and the direct-current voltage generator circuit are in an integrated circuit chip, and the reference direct-current voltage is substantially equal to a threshold level of at least one of the first and second MOS transistors.

7. The rectifier circuit according to claim 6, wherein the direct-current voltage generator circuit includes
   a third MOS transistor that has a drain and a gate which are connected to each other; and
   a constant-current source that is connected to the drain of the third MOS transistor.

8. The rectifier circuit according to claim 7, wherein the direct-current voltage generator circuit uses a voltage between the drain and a source of the third MOS transistor as the reference direct-current voltage, the voltage between the drain and the source of the third MOS transistor being generated by a constant current flowing between the drain and the source of the third MOS transistor.

9. The rectifier circuit according to claim 7, wherein the third MOS transistor is formed in a ratio of a gate width to a gate length of at least one of the first and second MOS transistors.

10. The rectifier circuit according to claim 7, wherein the direct-current voltage generator circuit further includes a switching unit that is connected between the constant-current source and the third MOS transistor, the direct-current voltage generator circuit intermittently outputs the reference direct-current voltage by the switching unit, and the constant-current source supplies a constant current.

11. A rectifier circuit comprising a first rectifier circuit and a second rectifier circuit, each of which has a same structure as that of the rectifier circuit according to claim 1, wherein the first and second rectifier circuits are stacked with each other.

12. The rectifier circuit according to claim 1, wherein one of the first and the second direct-current voltages is variable.

13. The rectifier circuit according to claim 1, wherein each of the first bias circuit includes the first capacitor, which holds the first direct-current voltage.

14. The rectifier circuit according to claim 1, wherein each of the first and the second bias circuits includes
- a first switching unit that is connected to a predetermined voltage source;
- a third capacitor that holds a voltage supplied through the first switching unit;
- a second switching unit that is connected to the third capacitor, an operation of the second switching unit being complementary with an operation of the first switching unit; and
- a fourth capacitor that holds a voltage supplied through the second switching unit, as the respective direct-current voltage.

15. A rectifier circuit, comprising:
- a first floating-gate transistor that has a control gate and a source which are connected to each other, a drain, and a first floating gate which holds a predetermined potential based on a clock signal so that the first floating gate MOS transistor is biased;
- a second floating-gate transistor that has a control gate and a source which are connected to each other, a drain which is connected to the source of the first floating-gate transistor, and a second floating gate which holds a predetermined potential based on a clock signal, so that the second floating gate MOS transistor is biased; and
- a coupling capacitor that has a first end which is connected to the source of the first floating-gate transistor, and a second end to which an alternating-current signal is input.

16. The rectifier circuit according to claim 15, wherein a potential at the first floating gate is substantially equal to a threshold level of the first floating-gate transistor, and a potential at the second floating gate is substantially equal to a threshold level of the second floating-gate transistor.

17. The rectifier circuit according to claim 15, further comprising:
- a first direct-current voltage source that is connected to the drain of the first floating-gate transistor;
- a second direct-current voltage source that is connected to the drain of the second floating-gate transistor;
- a third direct-current voltage source that is connected to the source of the second floating-gate transistor; and
- a control unit that performs a charging or a discharging on each of the first and second floating gates by controlling each output voltage of the first, second, and third direct-current voltage sources.

18. A radio communication device, comprising:
an antenna;
a rectifier circuit that includes
- a first bias circuit that outputs a first direct-current voltage to charge a first capacitor based on a clock signal,
- a second bias circuit that outputs a second direct-current voltage to charge a second capacitor based on a clock signal,
- a first MOS transistor that has a gate and a source, the first direct-current voltage being applied between the gate and the source of the first MOS transistor to bias the gate of the first MOS transistor,
- a second MOS transistor that has a gate and a source, and a drain connected to the source of the first MOS transistor, the second direct-current voltage being applied between the gate and the source of the second MOS transistor to bias the gate of the second MOS transistor, and
- a coupling capacitor that has a first end which is connected to the source of the first MOS transistor, and a second end to which an alternating-current signal is input; and a signal processing circuit that processes a transmitted and received signal based on a direct current rectified by the rectifier circuit.

19. The radio communication device according to claim 18, further comprising:
a battery that is charged by the direct current rectified by the rectifier circuit, wherein the rectifier circuit, a memory, and the signal processing circuit are connected to the battery.

20. The radio communication device according to claim 19, further comprising:
a sensor, wherein the signal processing circuit transmits a signal detected by the sensor, through a loop antenna.

21. The radio communication device according to claim 19, further comprising:
an input/output device, wherein the signal processing circuit activates the input/output device according to a signal received through a loop antenna.

\* \* \* \* \*